US008380399B2

(12) United States Patent  
Fujimoto

(10) Patent No.: US 8,380,399 B2
(45) Date of Patent: Feb. 19, 2013

(54) ELECTRIC POWER STEERING DEVICE

(75) Inventor: Masaki Fujimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/984,173

(22) Filed: Jan. 4, 2011

(65) Prior Publication Data

US 2011/0098887 A1      Apr. 28, 2011

Related U.S. Application Data

(63) Continuation of application No. PCT/JP2009/051393, filed on Jan. 22, 2009.

(51) Int. Cl.
*A01B 69/00* (2006.01)

(52) U.S. Cl. .......................................... 701/41; 180/443
(58) Field of Classification Search .................... 701/41, 701/42; 180/443, 446
See application file for complete search history.

(56) References Cited

U.S. PATENT DOCUMENTS

| | | | | |
|---|---|---|---|---|
| 5,809,438 | A * | 9/1998 | Noro et al. ....................... | 701/41 |
| 7,402,982 | B2 * | 7/2008 | Ito et al. ........................ | 320/150 |
| 2005/0017664 | A1 * | 1/2005 | Takahashi et al. .............. | 318/432 |
| 2006/0097671 | A1 * | 5/2006 | Yoshida ......................... | 318/109 |
| 2007/0052381 | A1 * | 3/2007 | Ueda et al. .................... | 318/432 |
| 2007/0252547 | A1 | 11/2007 | Kifuku et al. | |
| 2007/0282499 | A1 * | 12/2007 | Maeda et al. .................. | 701/41 |
| 2008/0035411 | A1 * | 2/2008 | Yamashita et al. ............. | 180/443 |
| 2008/0066995 | A1 * | 3/2008 | Yabuguchi et al. ............ | 180/446 |
| 2008/0114515 | A1 * | 5/2008 | Hara ............................... | 701/42 |

FOREIGN PATENT DOCUMENTS

| | | |
|---|---|---|
| JP | 1-240369 | 9/1989 |
| JP | 6-8839 | 1/1994 |
| JP | 9-30431 | 2/1997 |
| JP | 09-221051 | 8/1997 |
| JP | 2005-219618 | 8/2005 |
| JP | 2006-062616 | 3/2006 |
| JP | 2006-297970 | 11/2006 |
| JP | 2007-15474 | 1/2007 |
| JP | 2007-153150 | 6/2007 |
| JP | 2007-300749 | 11/2007 |
| WO | WO 2007/004357 | 1/2007 |

OTHER PUBLICATIONS

International Search Report issued on Apr. 28, 2009 in PCT/JP2009/051393 filed Jan. 22, 2009.
International Written Opinion issued on Apr. 28, 2009 in PCT/JP2009/051393 filed Jan. 22, 2009.

* cited by examiner

*Primary Examiner* — Behrang Badii
*Assistant Examiner* — Shardul Patel
(74) *Attorney, Agent, or Firm* — Oblon, Spivak, McClelland, Maier & Neustadt, L.L.P.

(57) ABSTRACT

An Assist Control Unit 61 detects a power generation state of an electric motor where the direction for generating torque of motor current im does not match the rotational direction of steering speed ωx (S12), and calculates an Amount E Corresponding to Power Generation Energy during a period when the power generation state is detected continuously (S15). When the Amount E Corresponding to Power Generation Energy exceeds a Criterion Value E0 (S16: Yes), the state is judged as a reverse input state that a large reverse input is acting on a steering mechanism from a tire. Consequently, a small reverse input state not affecting the steering mechanism is excluded, and a large reverse input state having a risk of affecting the steering mechanism can be detected precisely.

14 Claims, 12 Drawing Sheets

ELECTRIC POWER STEERING DEVICE

TECHNICAL FIELD

The present invention relates to an electric power steering device to for assisting a driver's steering operation by means of driving by an electric motor.

BACKGROUND ART

Conventionally, an electric power steering device is known as a device for assisting a driver's steering operation by transmitting output torque of an electric motor to a steering shaft, a rack bar or the like of a steering mechanism. During a vehicle is running, when large force is input from a tire to a steering mechanism, for example, when a tire strikes on a curb, a wheel is steered and a large axial tension acts on a rack bar. Consequently, the rack bar moves in its axial direction and the steering shaft connected to the rack bar rotates. A state that, as described above, a reverse input is acting on a steering mechanism from a tire and a wheel is steered is referred to as a reverse input state. When the reverse input is large, a rack-end member disposed at the end of the rack bar strikes on a stopper member formed in a rack housing and impact force acts on the steering mechanism.

Therefore, for example, the electric power steering device proposed in Japanese Patent Application Laid-Open (kokai) No. 6-8839 is configured such that turning force of an electric motor is transmitted to a steering mechanism via clutch and inertia torque of the electric motor is not transmitted to the steering mechanism by letting the clutch out when a reverse input state is detected. The detection of the reverse input state is performed by comparing the steering speed detected by steering speed sensor with a preset value. Namely, when the steering speed exceeds the preset value, the state is judged as a reverse input state.

DISCLOSURE OF THE INVENTION

However, if a reverse input state is judged based simply on steering speed, for example, when a vehicle passes over a shallow groove such as a rut, its steering speed exceeds a preset value, and control to relax impact force delivered to a steering mechanism is performed even in such a case. Accordingly, it is impossible to distinguish between a state that a large reverse input having a risk of affecting a steering mechanism (impact relaxation is necessary) is acting as in a case when a tire strikes on a curb and a state that a small reverse input not affecting a steering mechanism (impact relaxation is necessary) is acting.

The present invention has been conceived to address the above-described problems, and the purpose of the present invention is in that a small reverse input state not affecting a steering mechanism is excluded and a large reverse input state having a risk of affecting the steering mechanism is detected precisely.

In order to achieve the above purpose, a feature of the present invention is in that an electric power steering device for assisting a driver's steering operation by means of driving by an electric motor disposed in a steering mechanism comprises:

a motor output detection means to detect an output of said electric motor, a rotational state detection means to detect a rotational state of said steering mechanism, a power generation state detection means to detect a power generation state of said electric motor where the direction for generating torque of said electric motor does not match the rotational direction of said steering mechanism, based on the detection results of said motor output detection means and said rotational state detection means, a power generation energy calculation means to calculate an amount corresponding to power generation energy generated at said electric motor during a period when said power generation state is detected continuously, a reverse input detection means to judge a state as a reverse input state that a reverse input is acting on said steering mechanism from a tire, when said calculated amount corresponding to power generation energy exceeds a criterion value, and a reverse input rotation suppression means to suppress the rotation of said steering mechanism by said reverse input, when said reverse input detection means detects the reverse input state.

In this case, preferably, said rotational state detection means detects the rotational speed of said electric motor, or the rotational speed of a steering shaft.

In the present invention, a motor output detection means detects an output of an electric motor, and a rotational state detection means detects a rotational state of a steering mechanism. A rotational state of a steering mechanism refers to a rotational state of a member which is disposed in a steering mechanism and rotates in accordance with a steering operation. Accordingly, a rotational state of a steering mechanism is easily detected by detecting rotational speed of an electric motor or rotational speed of a steering shaft.

When a reverse input acts from a tire and a steering wheel is turned, a steering mechanism (steering shaft) rotates rapidly and this rotational motion energy rotates the rotor of an electric motor. At this time, an electric current flows through a motor coil in a direction for suppressing the rotation of the steering mechanism and the electric motor comes into a power generation state. Accordingly, the direction for generating torque of an electric motor does not match the rotational direction of a steering mechanism (opposite direction). In addition, in a case where a large reverse input acts, for example, when a tire strikes on a curb, an amount of power generation energy generated during one continuous power generation period of an electric motor is large. Therefore, in the present invention, a power generation state detection means, a power generation energy calculation means, and a reverse input detection means are comprised, and a large reverse input state having a risk of affecting a steering mechanism is precisely detected by capturing such phenomena.

The power generation state detection means detects a power generation state of an electric motor where the direction for generating torque of the electric motor does not match the rotational direction of a steering mechanism, based on the detection results of the motor output detection means and the rotational state detection means. The power generation energy calculation means calculates an amount corresponding to power generation energy generated at the electric motor during a period when the power generation state is detected continuously. Then, the reverse input detection means judges a state as a reverse input state that a reverse input is acting on the steering mechanism from a tire, when the amount corresponding to power generation energy and calculated by the power generation energy calculation means exceeds a criterion value. Consequently, a small reverse input state not affecting the steering mechanism is excluded, and a large reverse input state having a risk of affecting the steering mechanism can be detected precisely.

When a reverse input state is thus detected, the reverse input rotation suppression means suppresses the rotation of the steering mechanism by the reverse input. Accordingly, an impact generated at the steering mechanism can be relaxed.

Another feature of the present invention is in that said motor output detection means is a motor current detection means to detect an electric current flowing through said electric motor, said power generation state detection means detects a power generation state of said electric motor where the direction for generating torque of said electric motor with the electric current detected by said motor current detection means does not match the rotational direction of said steering mechanism detected by said rotational state detection means, and said power generation energy calculation means calculates, as said amount corresponding to power generation energy, a time integration value of a product of the electric current detected by said motor current detection means and the rotational speed detected by said rotational state detection means during a period when said power generation state is detected continuously.

In the present invention, the direction for generating torque of an electric motor can be judged by detecting an electric current flowing through the electric motor with a motor current detection means. Consequently, the power generation state of the electric motor can be easily detected. A power generation energy calculation means calculates, as an amount corresponding to power generation energy, a time integration value of a product of the electric current detected by the motor current detection means and a rotational speed detected by a rotational state detection means during a period when said power generation state is detected continuously. Consequently, the amount corresponding to power generation energy can be appropriately calculated. The amount corresponding to power generation energy does not have to be the same value as an amount of power generation energy, and it is a value to be compared with a criterion value for judging the reverse input state, and therefore it may be a value that increases and decreases in accordance with the increasing and decreasing of a power generation energy.

Another feature of the present invention is in that said reverse input rotation suppression means controls the drive circuit of said electric motor and short-circuits between the phases of said electric motor to apply a brake to said electric motor.

Since, thereby, a short-circuit current flows through a motor coil and braking force to stop the rotation of a rotor acts, the rotational speed of a steering mechanism can be decreased. Therefore, the impact occurs when a rack bar reaches the stroke-end position, i.e. when a rack-end member strikes on a stopper, can be relaxed. Accordingly, the durability of a steering mechanism, especially a steering shaft, can be improved. in addition, since any power distribution for steering assist by an electric motor is not performed, even though handle inertia force twists a torsion bar of the steering mechanism on the collision of the rack-end member to the stopper, steering assist torque in the direction of the collision is not generated thereby. Thus, also, the torque acting on the steering shaft can be decreased.

Another feature of the present invention is in that said electric power steering device comprises:

a voltage converter to convert the output voltage of an onboard battery to supply electric power to a drive circuit of said electric motor, a subsidiary power supply, which is connected in parallel with the drive circuit of said electric motor to said voltage converter to be charged by said voltage converter and to aid the power supply for the drive circuit of said electric motor by discharging its stored electric energy, and a regeneration control means to control the drive circuit of said electric motor to make said subsidiary power supply absorb the power generation energy generated at said electric motor.

Since, in the present invention, a voltage converter to convert the output voltage of an onboard battery to supply electric power to a drive circuit of an electric motor is comprised, an electric motor can be driven with a large electric power. In addition, a subsidiary power supply is also connected to the voltage converter. The subsidiary power supply is charged by the output of the voltage converter and discharges its stored electric energy to aid the power supply for the drive circuit of the electric motor. Namely, when large electric power is consumed in the drive circuit of the electric motor, the subsidiary power supply can aid the power supply. Accordingly, without increasing the capacity of the onboard battery, the output of the electric power steering device can be increased.

When the electric motor generates electric power, it is necessary to discharge its power generation energy. Especially, when a brake is applied by short-circuiting between the phases of the electric motor, the power generation energy is consumed as heat the electric motor and the elements in the drive circuit (a motor coil, a switching element and the like). Accordingly, since it is necessary to prevent the overheat of the electric motor and the drive circuit, a brake by means of the short-circuit between the phases is restricted. Therefore, in the present invention, heat generation is suppressed by making the subsidiary power supply absorb the power generation energy generated at the electric motor (regenerating the power generation energy generated at the electric motor to the subsidiary power supply). For example, a brake is applied by short-circuiting between the phases, and thereafter the power generation energy stored in the electric motor is absorbed by the subsidiary power supply. Thereby, it becomes possible to prevent the overheat of the electric motor and the drive circuit as well as to apply a brake to the electric motor. In addition, the load to the voltage converter is smaller as compared with the case where an onboard battery absorbs the power generation energy generated at the electric motor (the power generation energy generated at the electric motor is regenerated to an onboard battery).

Another feature of the present invention is in that said electric power steering device comprises:

a charge restriction means to restrict the charging rate of said subsidiary power supply at a upper limit of charging rate or below, and an upper limit charging rate alteration means to increase said upper limit of charging rate when the reverse input detection means judges the state as a reverse input state.

In the present invention, the charge restriction means restricts the charging rate of the subsidiary power supply at a upper limit of charging rate or below to prevent the overheat of the subsidiary power supply. Under such a restriction of an upper limit of charging rate, when a reverse input acts on the steering mechanism, the power generation energy generated at the electric motor cannot be sufficiently absorbed by the subsidiary power supply. Namely, the power generation energy absorbed by the subsidiary power supply is restricted to a small amount. Therefore, in the present invention, when the reverse input detection means judges the state as a reverse input state, the upper limit charging rate alteration means increases the upper limit of charging rate. Accordingly, the electric capacity that the subsidiary power supply can absorb increases, and the power generation energy generated at the electric motor can be sufficiently absorbed by the subsidiary power supply.

BEST MODE FOR CARRYING OUT THE INVENTION

Figure 1:
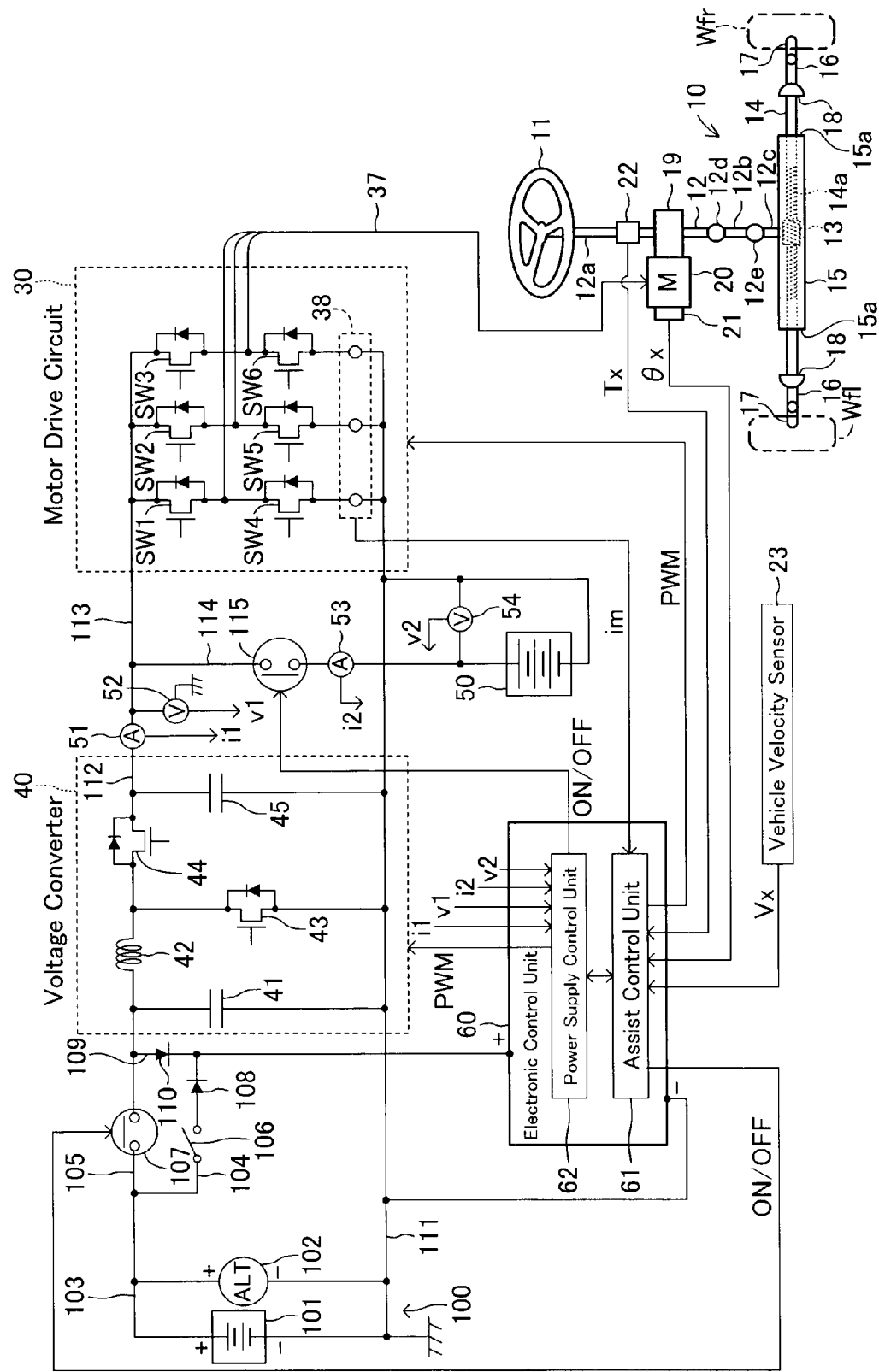
FIG. 1 is a schematic diagram of an electric power steering device according to an embodiment of the present invention.

Referring to the drawings, an electric power steering device according to one embodiment of the present invention will be described hereinafter. FIG. 1 shows a schematic configuration of an electric power steering device for vehicle according to the present embodiment.

The electric power steering device comprises as major parts a Steering Mechanism 10 to steer a Left-Front Wheel Wfl and a Right-Front Wheel Wfr, which are wheels to be steered, by the steering operation of a Steering Handle 11, an Electric Motor 20 assembled to the Steering Mechanism 10 to generate a steering assist torque, a Motor Drive Circuit 30 for driving the Electric Motor 20, a Voltage Converter 40 to convert the output voltage of a Main Power Supply 100 to supply electric power to the Motor Drive Circuit 30, a Subsidiary Power Supply 50 connected in parallel with the power supply circuit between the Voltage Converter 40 and the Motor Drive Circuit 30, and an Electronic Control Unit 60 to control the actions of the Electric Motor 20 and the Voltage Converter 40.

The Steering Mechanism 10 is configured to convert the rotational motion of a Steering Shaft 12 around its axis line in conjunction with the turning operation of the Steering Handle 11 into the stroke motion in longitudinal direction of a Rack Bar 14 by means of a Rack and Pinion Mechanism 13, and to steer the Left-Front Wheel Wfl and the Right-Front Wheel Wfr, which are wheels to be steered, by the stroke motion of the Rack Bar 14. The Steering Shaft 12 comprises a Main Shaft 12a with the Steering Handle 11 connected at the upper end thereof, a Pinion Shaft 12c connected with the Rack and Pinion Mechanism 13, and an Intermediate Shaft 12b connecting the Main Shaft 12a and the Pinion Shaft 12c through a Universal Joints 12d and 12e.

The Gear Portion 14a of the Rack Bar 14 is stored within a Rack Housing 15, and the both of the left and right ends of the Rack Bar 14 expose out of the Rack Housing 15 and are connected with a Tie Rods 16. The other ends of the left and right Tie Rods 16 connected with the Knuckles 17 placed in the Left and Right Front Wheels Wfl and Wfr. At the connection section of the Rack Bar 14 with the Tie Rods 16, Rack-end Members 18 are placed. On the other hand, at the both ends of the Rack Housing 15, Stopper Members 15a are formed. The range of the stroke motion in longitudinal direction of the Rack Bar 14 is mechanically limited by the abutment of the Rack-end Members 18 against the Stopper Members 15a. Hereinafter, the position, at which the motion of the Rack Bar 14 is limited by the Stopper Members 15a, may be referred to as "stroke end." In addition, the Left-Front Wheel Wfl and the Right-Front Wheel Wfr may be simply referred to as "Wheels To Be Steered W."

On the Steering Shaft 12 (Main Shaft 12a), an Electric Motor 20 is mounted via Reduction Gears 19. As the Electric Motor 20, for example, a brushless three-phase motor is used. The Electric Motor 20 rotationally drives the Steering Shaft 12 around its central axis via the Reduction Gears 19 by means of the rotation of its rotor, and imparts steering assist torque according to the rotating operation of the Steering Handle 11.

In the Electric Motor 20, a Rotation Angle Sensor 21 is disposed. The Rotation Angle Sensor 21 is disposed within the Electric Motor 20, and outputs a detection signal corresponding to the rotation angular position of a rotor of the Electric Motor 20. The detection signal of the Rotation Angle Sensor 21 is utilized to calculate the rotation angle and rotation angular velocity of the Electric Motor 20. On the other hand, since the rotation angle of the Electric Motor 20 is proportional to the steering angle of the Steering Handle 11, it is commonly used also as the steering angle of the Steering Handle 11. In addition, since the rotation angular velocity, which is the derivative of the rotation angle of the Electric Motor 20 with respect to time, is proportional to the steering angular velocity of the Steering Handle 11, it is commonly used also as the steering speed of the Steering Handle 11. Hereinafter, the value of the steering angle of the Steering Handle 11 detected through the output signal of the Rotation Angle Sensor 21 will be referred to as a Steering Angle $\theta x$, and the value of the steering angular velocity obtained by differentiating the Steering Angle $\theta x$ with respect to time is referred to as a Steering Speed $\omega x$. The positive and negative values of the Steering Angle $\theta x$ represent steering angles to the right direction and left direction, respectively, from the neutral position of the Steering Handle 11. In the present embodiment, the neutral position of the Steering Handle 11 is represented as "0" and the steering angle to the right direction from the neutral position is represented as a positive value and the steering angle to the left direction from the neutral position is represented as a negative value. The Steering Speed $\omega x$ represents the steering speed as a positive value when the Steering Handle 11 is rotating to the right direction, and represents the steering speed as a negative value when the Steering Handle 11 is rotating to the left direction. The steering speed is proportional to the rotational speed of the Steering Shaft 12, and corresponds to the rotational speed of the steering mechanism in the present invention. In addition, the magnitude of steering angle and the magnitude of the steering speed is represented in the absolute figure thereof.

On the Steering Shaft 12 (Main Shaft 12a), a Steering Torque Sensor 22 is disposed between the Steering Handle 11 and the Reduction Gears 19. The Steering Torque Sensor 22 detects the torsional force acting on a torsion bar (not shown)

interposed in the Steering Shaft 12 (Main Shaft 12a) as a Steering Torque Tx imparted to the Steering Handle 11. For example, the Steering Torque Tx is detected based on the difference in the rotational angles detected by two resolvers disposed at the both ends of the torsion bar in its axial direction.

regarding the Steering Torque Tx, torque acting on the Steering Shaft 12 to the right-hand turning direction (torque under twisted condition where the upper portion of the torsion bar is placed at a relatively right-hand turned position against the lower portion of the torsion bar) is represented as a positive value, and torque acting on the Steering Shaft 12 to the left-hand turning direction (torque under twisted condition where the upper portion of the torsion bar is placed at a relatively left-hand turned position against the lower portion of the torsion bar) is represented as a negative value. In addition, the magnitude of steering torque is represented in the absolute figure thereof.

The Motor Drive Circuit 30 has a configuration where 6 Switching Elements SW1 to SW6 consisting of MOS-FET (Metal Oxide Semiconductor Field Transistor) constitute a three-phase inverter circuit. Specifically, it adopts a configuration where an upper arm circuit, wherein the first Switching Element SW1 and the second Switching Element SW2 and the third Switching Element SW3 are arranged in parallel, and a lower arm circuit, wherein the fourth Switching Element SW4 and the fifth Switching Element SW5 and the sixth Switching Element SW6 are arranged in parallel, are series-connected, and a Power Supply Line 37 to the Electric Motor 20 gets out from between the upper and lower arm circuits.

In the Motor Drive Circuit 30, a Motor Current Sensor 38 to detect the electric current flowing through the Electric Motor 20 is disposed. The Motor Current Sensor 38 respectively detects the electric current flowing through each of the phases (U phase, V phase, and W phase), and outputs a detection signal corresponding to the value of the detected electric currents to an Assist Control Unit 61 of the Electronic Control Unit 60. Hereinafter, the electric current measured by the Motor Current Sensor 38 is referred to as a Motor Current im. The Motor Current im represents an electric current flowing to make the Electric Motor 20 generate steering torque to the right direction as a positive value, and represents an electric current flowing to make the Electric Motor 20 generate steering torque to the left direction as a negative value. In addition, the magnitude of a motor current is represented in the absolute figure thereof.

In each of the Switching Elements SW1 to SW6, a gate thereof is respectively connected to the Electronic Control Unit 60, and the duty ratio is controlled through a PWM control signal output from the Electronic Control Unit 60. Thereby, the drive voltage of the Electric Motor 20 is adjusted to a target voltage. In addition, as shown by the circuit symbols in the drawing, each of the MOS-FETs' constituting the Switching Elements SW1 to SW6 has a diode parasitizing therein for structural reason.

Next, the power supply system of the electric power steering device will be described. The electric power steering device is provided with electric power by the Main Power Supply 100, which is an in-vehicle power supply. The Main Power Supply 100 has a configuration where a Main Battery 101, which is a standard in-vehicle battery with a rated output voltage of 12 V, and an Alternator 102 with a rated output voltage of 14 V, which generates electric power by the revolution of an engine are connected in parallel. An Power Supply Source Line 103 is connected to the power terminal (positive terminal) of the Main Battery 101, and a Ground Line 111 is connected to the ground terminal thereof. The Alternator 102 is connected between the Power Supply Source Line 103 and the Ground Line 111.

The Power Supply Source Line 103 branches to a Control-system Power Line 104 and a Drive-system Power Line 105. The Control-system Power Line 104 functions as a power supply line for supplying electric power to the Electronic Control Unit 60. The Drive-system Power Line 105 functions as a power supply line for supplying electric power to both of the Motor Drive Circuit 30 and the Electronic Control Unit 60.

To the Control-system Power Line 104, an Ignition Switch 106 is connected. To the Drive-system Power Line 105, a Main Power Supply Relay 107 is connected. The Main Power Supply Relay 107 closes its contact point through an ON signal from the Assist Control Unit 61 of the Electronic Control Unit 60 to form an electric power supply circuit to the Electric Motor 20, and opens the contact point through an OFF signal to shut off the power supply circuit to the Electric Motor 20. The Control-system Power Line 104 is connected to the power terminal (positive terminal) of the Electronic Control Unit 60, and comprises a Diode 108 at a position thereon closer to the load side (the Electronic Control Unit 60 side) than the Ignition Switch 106. The Diode 108 is disposed with its cathode facing the Electronic Control Unit 60 and its anode facing the Main Power Supply 100, and is a backflow prevention element which enables the power supply only in the power supply direction.

On the Drive-system Power Line 105, a Link Line 109 branches and is disposed at a position closer to the load side than the Main Power Supply Relay 107. The Link Line 109 is connected at a position closer to the Electronic Control Unit 60 side than the connection position of the Diode 108 on the Control-system Power Line 104. In addition, to the Link Line 109, a Diode 110 is connected. The Diode 110 is disposed with its cathode facing the Control-system Power Line 104 and its anode facing the Drive-system Power Line 105. Accordingly, it has a circuit configuration where electric power can be supplied from the Drive-system Power Line 105 to the Control-system Power Line 104 via the Link Line 109, but electric power cannot be supplied from the Control-system Power Line 104 to the Drive-system Power Line 105. The Drive-system Power Line 105 and the Ground Line 111 are connected to the Voltage Converter 40. In addition, the Ground Line 111 is also connected to the ground terminal of the Electronic Control Unit 60, as well.

The Voltage Converter 40 consists of a Condenser 41 deposited between the Drive-system Power Line 105 and the Ground Line 111, a Voltage Converting Coil 42 series-connected in the Drive-system Power Line 105 closer to the load side than the connection point of the Condenser 41, the First Voltage Converting Switching Element 43 deposited between the Drive-system Power Line 105 at load side of the Voltage Converting Coil 42 and the Ground Line 111, the Second Voltage Converting Switching Element 44 series-connected in the Drive-system Power Line 105 closer to the load side than the connection point of the First Voltage Converting Switching Element 43, and a Condenser 45 deposited between the Drive-system Power Line 105 at load side of the Second Voltage Converting Switching Element 44 and the Ground Line 111. To the secondary side of the Voltage Converter 40, a Converted Power Line 112 is connected.

Although MOS-FETs' are used as the Voltage Converting Switching Elements 43 and 44 in the present embodiment, other switching elements can be used. In addition, as shown by the circuit symbols in the drawing, each of the MOS- FETs' constituting the Voltage Converting Switching Elements 43 and 44 has a diode parasitizing therein for structural reason.

The voltage conversion by the Voltage Converter 40 is controlled by the Power Supply Control Unit 62 of the Electronic Control Unit 60. The Power Supply Control Unit 62 outputs a pulse signal with a predetermined period to the gates of the First and Second Voltage Converting Switching Elements 43 and 44 to turn on and off both of the Switching Elements 43 and 44, and converts the electric power supplied from the Main Power Supply 100 to generate a predetermined output voltage at the Converted Power Line 112. In this case, the First and Second Voltage Converting Switching Elements 43 and 44 are controlled so that they are turned on and off oppositely with each other. The Voltage Converter 40 operates so that it turns on the First Voltage Converting Switching Element 43 and turns off the Second Voltage Converting Switching Element 44 and flows electric current through the Voltage Converting Coil 42 only for a short period to store electric power in the Voltage Converting Coil 42, and immediately thereafter it turns off the First Voltage Converting Switching Element 43 and turns on the Second Voltage Converting Switching Element 44 and outputs the electric power stored in the Voltage Converting Coil 42.

The output voltage of the Second Voltage Converting Switching Elements 44 is smoothed by the Condenser 45. Accordingly, stable converted electric power is output from the Converted Power Line 112. In this case, plural condensers with different frequency characteristics may be connected in parallel to improve the smoothing property. In addition, the Condenser 41 disposed at the entrance side of the Voltage Converter 40 removes noises to the Main Power Supply 100.

The converted voltage (output voltage) of the Voltage Converter 40 is adjustable by controlling the duty ratio of the First and Second Voltage Converting Switching Elements 43 and 44 (PWM control), and they are configured so that the output voltage can be adjusted, for example, within the range from 20 V to 50 V. As the Voltage Converter 40, general-purpose DC-DC converters can be used.

The Converted Power Line 112 branches to a Converted Drive Line 113 and a Charge Discharge Line 114. The Converted Drive Line 113 is connected to the power input portion of the Motor Drive Circuit 30. The Charge Discharge Line 114 is connected to the positive terminal of the Subsidiary Power Supply 50.

The Subsidiary Power Supply 50 is an electric storage device which is charged by the Voltage Converter 40, and supplies electric power to the Motor Drive Circuit 30 to assist the Main Power Supply 100 when large electric power is needed at the Motor Drive Circuit 30. Accordingly, the Subsidiary Power Supply 50 is configured by connecting plural storage cells in series so that a voltage corresponding to the converted voltage of the Voltage Converter 40 can be maintained. The ground terminal of the Subsidiary Power Supply 50 is connected to the Ground Line 111. As the Subsidiary Power Supply 50, for example, capacitors (electric double layer capacitors), secondary batteries, and the like can be used.

On the output side of the Voltage Converter 40, the First Current Sensor 51 and the First Voltage Sensor 52 are disposed. The First Current Sensor 51 outputs a detected signal representing the value of the electric current flowing through the Converted Power Line 112 to the Power Supply Control Unit 62 of the Electronic Control Unit 60. In addition, the First Voltage Sensor 52 outputs a detected signal representing the output voltage of the Voltage Converter to the Power Supply Control Unit 62. Hereinafter, the electric current detected by the First Current Sensor 51 will be referred to as an Output Current i1, and the voltage detected by the First Voltage Sensor 52 is referred to as an Output Voltage v1.

On the Charge Discharge Line 114, a Subsidiary Power Supply Relay 115 is disposed. The Subsidiary Power Supply Relay 115 closes its contact point through an ON signal from the Power Supply Control Unit 62 to form an charge discharge circuit for the Subsidiary Power Supply 50, and opens the contact point through an OFF signal to shut off the charge discharge circuit for the Subsidiary Power Supply 50. In addition, on the Charge Discharge Line 114, the Second Current Sensor 53 for detecting an electric current flowing through the Subsidiary Power Supply 50 and the Second Voltage Sensor 54 for detecting the output voltage (power supply voltage) of the Subsidiary Power Supply 50 are disposed. The Current Sensor 53 distinguishes the direction of the electric current, namely distinguishes the charge current flowing from the Voltage Converter 40 to the Subsidiary Power Supply 50 and the discharge current flowing from the Subsidiary Power Supply 50 to the Motor Drive Circuit 30, measures the magnitude thereof, and outputs signals corresponding to the detected values thereof to the Power Supply Control Unit 62. Hereinafter, the electric current detected by the Current Sensor 53 will be referred to as an Actual Charge Discharge Current i2, and the voltage detected by the Second Voltage Sensor 54 will be referred to as a Subsidiary Power Supply Voltage v2. In the present embodiment, the Actual Charge Discharge Current i2 is represented by using a positive value when it flows as a charge current, and is represented by using a negative value when it flows as a discharge current.

The Electronic Control Unit 60 is configured so as to comprise as a major part a microcomputer consisting of CPU, ROM, RAM and the like, and, from the viewpoint of functions, is roughly classified into an Assist Control Unit 61 and a Power Supply Control Unit 62. The Assist Control Unit 61 is connected with a Rotation Angle Sensor 21, a Steering Torque Sensor 22, a Motor Current Sensor 38, and a Vehicle Velocity Sensor 23, and inputs thereto sensor signals representing a Steering Angle $\theta x$, a Steering Torque Tx, a Motor Current im, and a Vehicle Velocity Vx.

Based on these sensor signals, the Assist Control Unit 61 outputs a PWM control signal to the Motor Drive Circuit 30 to control the driving of the Electric Motor 20 and assist the steering operation of a driver. In addition, the Assist Control Unit 61 always monitors whether a reverse input state wherein a reverse input is acting on the Steering Mechanism 10 from a tire or not, and stops the steering assist and suppresses the rotation of the Steering Mechanism 10 by applying a brake by means of the short-circuit between the phases of the Electric Motor 20. The rotation of the Steering Mechanism 10 means the rotation of the members which rotates according to the steering operation, i.e. the Steering Shaft 12 and the Electric Motor 20.

The Power Supply Control Unit 62 controls the charging and discharging of the Subsidiary Power Supply 50 by controlling the voltage conversion of the Voltage Converter 40. The Power Supply Control Unit 62 is connected with the First Current Sensor 51, the First Voltage Sensor 52, the Second Current Sensor 53, and the Second Voltage Sensor, and inputs thereto sensor signals representing the Output Current i1, the Output Voltage v1, the Actual Charge Discharge Current i2, and the Subsidiary Power Supply Voltage v2. The Power Supply Control Unit 62 is configured to be able to mutually send and receive a signal to and from the Assist Control Unit 61. The Power Supply Control Unit 62 outputs a PWM control signal to the Voltage Converter 40 based on these sensor signals and the sensor signals input to the Assist Control Unit

61. The Voltage Converter 40 changes the converted voltage, which is the output voltage thereof, by controlling the duty ratio of the First and Second Voltage Converting Switching Elements 43 and 44 in accordance with the input PWM control signal. In addition, the Power Supply Control Unit 62 raises the upper limit of charging rate of the Subsidiary Power Supply 50 to make the Subsidiary Power Supply 50 absorb the power generation energy generated at the Electric Motor 20 when the Assist Control Unit 61 detects a reverse input state.

Figure 2:
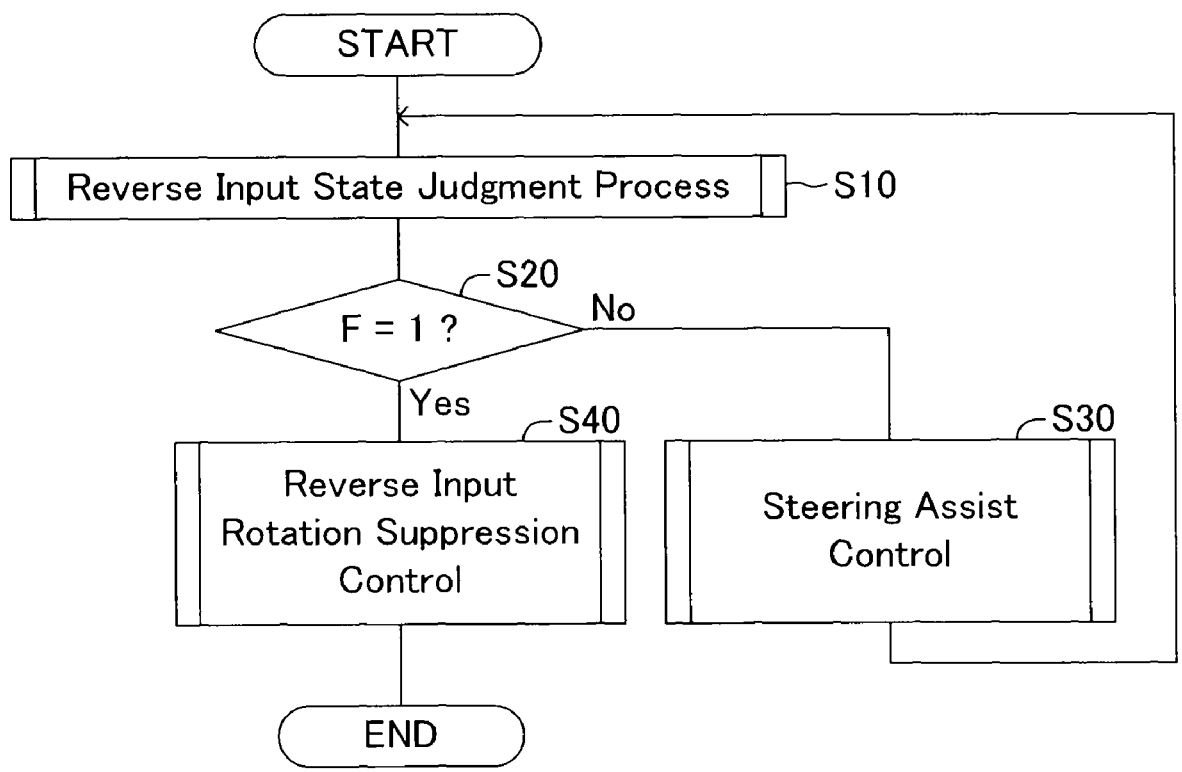
FIG. 2 is a flow chart showing a main routine executed by an assist control unit.

Next, the process performed by the Assist Control Unit 61 of the Electronic Control Unit 60 will be described. FIG. 2 shows a main control routine performed by the Assist Control Unit 61, and the main control routine is stored as a control program in an ROM of the Electronic Control Unit 60. The main control routine is started up by turning on an Ignition Switch 106. On starting the main control routine, a "ON" signal is output to the Main Power Supply Relay 107, and the contact point of the Main Power Supply Relay 107 is closed and electric power is supplied to the Voltage Converter 40.

Once the control routine starts up, in Step S10, the Assist Control Unit 61 performs the reverse input state judgment process. The reverse input state judgment process is processed in accordance with the subroutine shown in FIG. 3. Although this process will be described later, in this process, a large reverse input having a risk of affecting the Steering Mechanism 10, as in the case where a tire of the Wheels To Be Steered W strikes on a curb, is detected and a small reverse input not affecting the Steering Mechanism 10 is excluded from the detection targets. In reverse input state judgment process, a Judgment Flag F is set at "1" when a reverse input is detected, and the Judgment Flag F is set at "0" when a reverse input is not detected.

In Step S20, the Assist Control Unit 61 judges whether a reverse input is detected or not based on the Judgment Flag F, and when a reverse input is not detected (F=0), in Step S30, a steering assist control process is performed, and when a reverse input is detected (F=1), in Step S40, a reverse input rotation suppression control process is performed.

Figure 4:
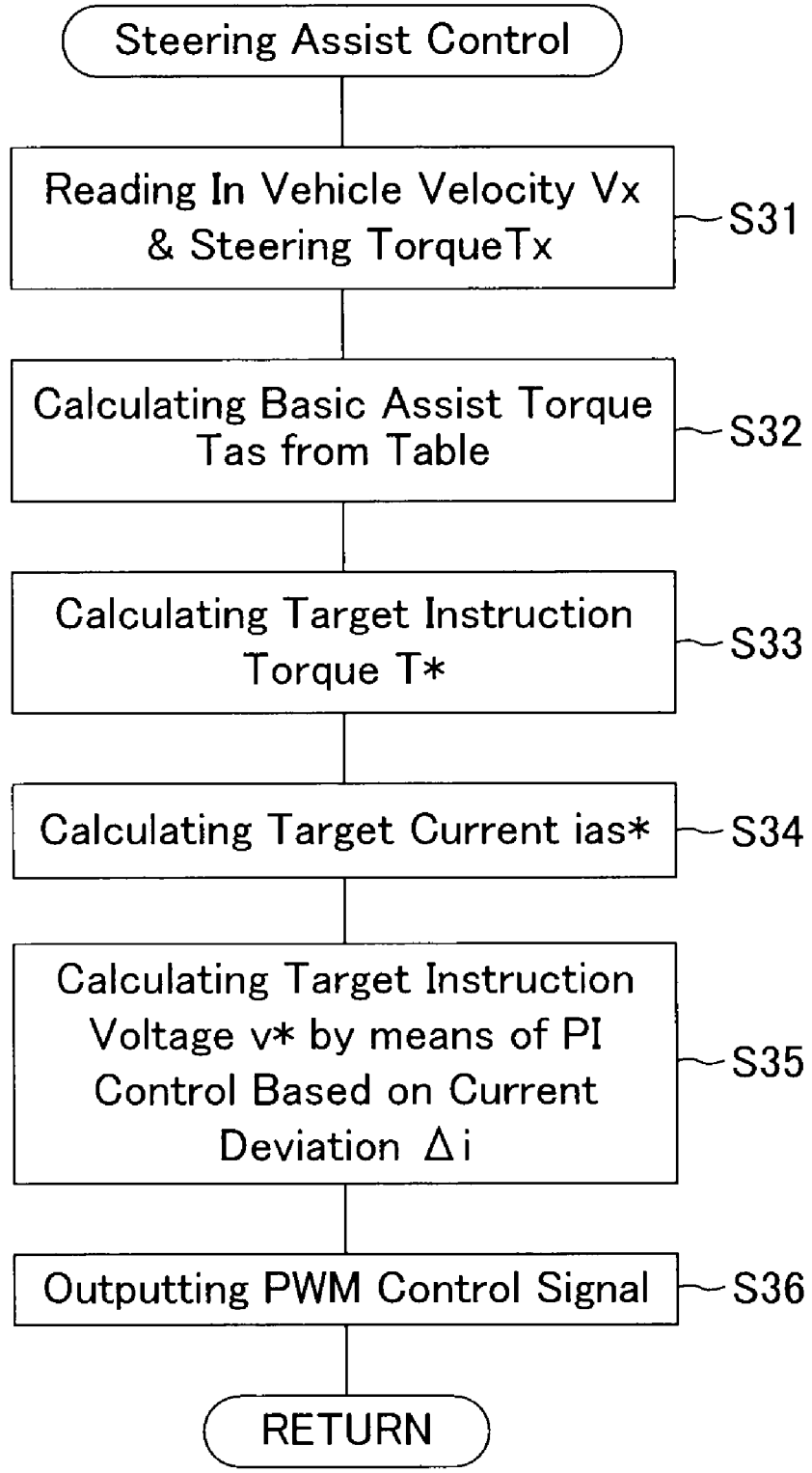
FIG. 4 is a flow chart showing a steering assist control subroutine.
Figure 5:
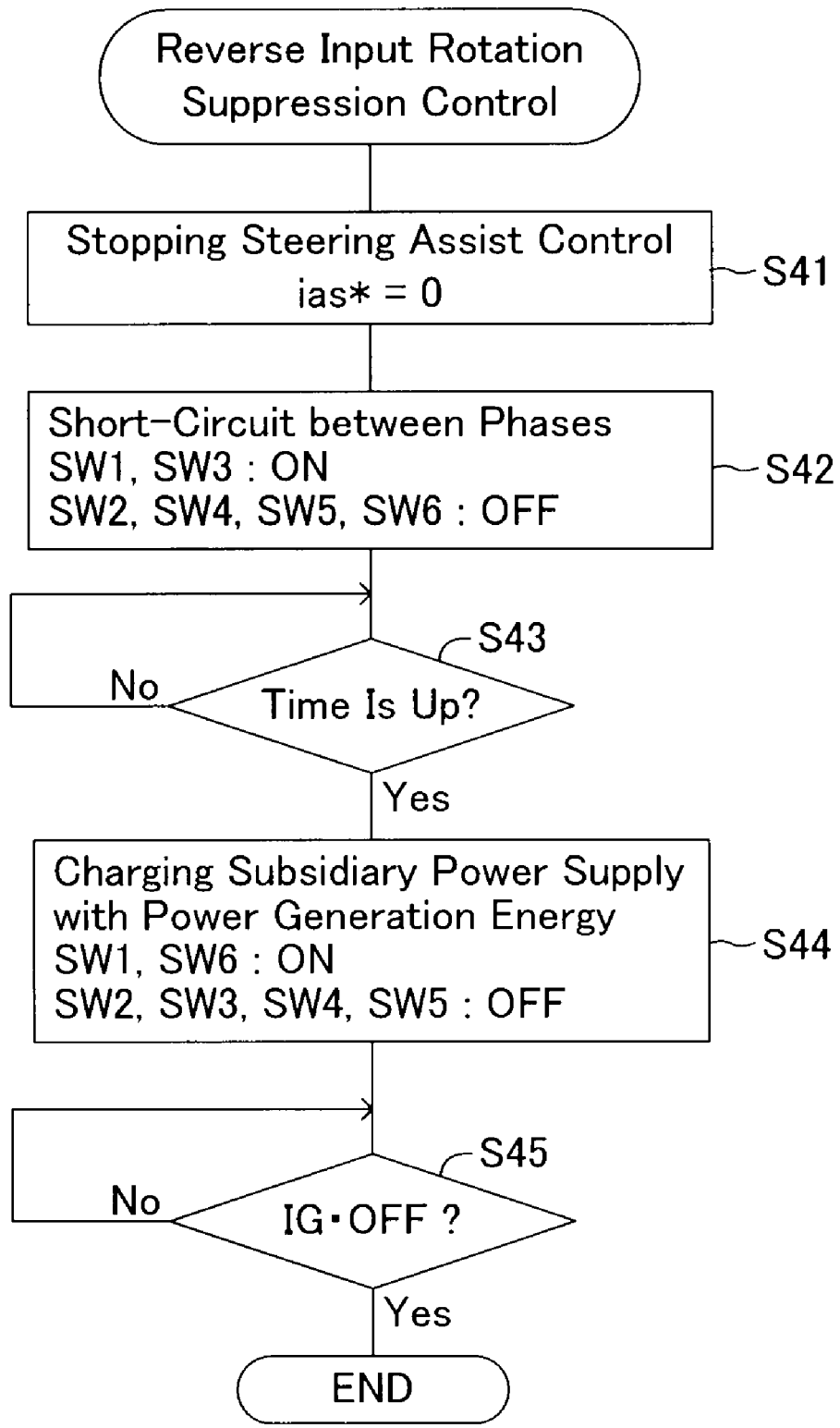
FIG. 5 is a flow chart showing a reverse input rotation suppression control subroutine.

The steering assist control process is processed in accordance with the subroutine shown in FIG. 4, and the reverse input rotation suppression control process is processed in accordance with the subroutine shown in FIG. 5. As long as the reverse input judgment process in Step S10 does not detect a reverse input, the Assist Control Unit 61 repeats the steering assist control process in Step 30 in a predetermined short cycle till the Ignition Switch 106 is turned off. On the other hand, when the reverse input judgment process in Step S10 detects a reverse input, the reverse input rotation suppression control process in Step S40 is performed and the main routine finishes. Accordingly, when a reverse input is detected, the steering assist control process is kept stopped till the Ignition Switch 106 is turned on again. However, it is possible to configure so that the steering assist control process is not restarted even if the Ignition Switch 106 is turned on again. In addition, it is possible to configure so that the steering assist control process is restarted when the reverse input rotation suppression control process finishes.

Figure 3:
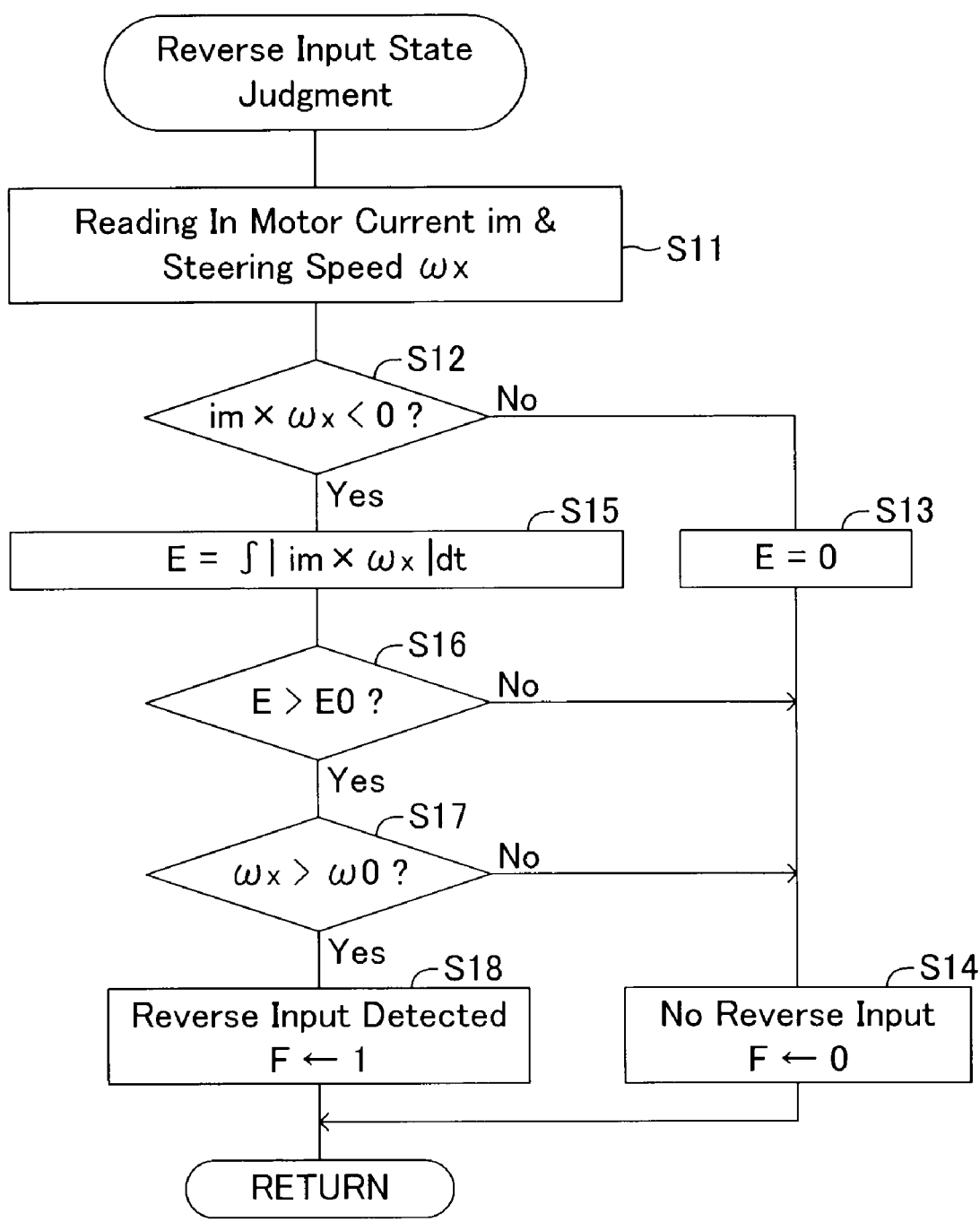
FIG. 3 is a flow chart showing a reverse input judgment subroutine.

First, the reverse input judgment process in Step S10 is described below. FIG. 3 is a flow chart specifically representing the process in Step S10 as a reverse input judgment subroutine. Once the flow chart showing a reverse input judgment subroutine starts up, the Assist Control Unit 61 first reads in the Motor Current im detected by the Motor Current Sensor 38 and the Steering Angle θx detected by the Rotation Angle Sensor 21 in Step S11.

Subsequently, in Step S12, the Assist Control Unit 61 judges whether the product of the Motor Current im and the Steering Speed ωx (im×ωx) is a negative value or not. The Steering Speed ωx is obtained by differentiating the Steering Angle θx with respect to time. The Motor Current im represents an electric current flowing to make the Electric Motor 20 generate steering torque to the right direction as a positive value, and represents an electric current flowing to make the Electric Motor 20 generate steering torque to the left direction as a negative value. The Steering Speed ωx represents the rotational speed of the Steering Shaft 12 to the right direction as a positive value, and represents the rotational speed of the Steering Shaft 12 to the left direction as a negative value. Accordingly, when the product of the Motor Current im and the Steering Speed ωx is a negative value, the rotor of the Electric Motor 20 is rotated by the rotation of the Steering Shaft 12, and thereby the Electric Motor 20 generates electric power.

When the judgment in Step S12 is "No", namely, when the state is judged as a state that the Electric Motor 20 does not generate electric power, the Assist Control Unit 61 clears the value of an Amount E Corresponding to Power Generation Energy to zero in Step S13, judges the state as "no reverse input" to set the Judge Flag F at "0" in Step S14, and exits from the reverse input judgment subroutine. On the other hand, when the judgment in Step S12 is "Yes", namely, when the state is judged as a state that the Electric Motor 20 generates electric power, the Assist Control Unit 61 calculates the Amount E Corresponding to Power Generation Energy in accordance with the following formula.

$$E = \int |im \times \omega x| dt$$

Since the reverse input judgment subroutine is repeatedly executed in a predetermined short cycle, in this Step S15, the absolute figure of the product of the Motor Current im and the Steering Speed ωx, |im×ωx|, is calculated in a predetermined cycle, and the accumulated value of the results of the calculation is regarded as the Amount E Corresponding to Power Generation Energy.

Subsequently, in Step S16, the Assist Control Unit 61 judges whether the calculated Amount E Corresponding to Power Generation Energy is larger than a Criterion Value E0 or not. When the Amount E Corresponding to Power Generation Energy is less than or equal to the Criterion Value E0 (S16: No), the Assist Control Unit 61 judges the state as "no reverse input" to set the Judge Flag F at "0" in Step S14, and exits from the reverse input judgment subroutine. The Amount E Corresponding to Power Generation Energy does not have to be the same value as an amount of power generation energy generated through the power generation by the Electric Motor 20, and it is a value to be compared with the Criterion Value E0 for judging the reverse input state, and therefore it may be a value that increases and decreases in accordance with the increasing and decreasing of a power generation energy actually generated at the Electric Motor 20.

In addition, the Assist Control Unit 61 outputs information representing the Judgment Flag F to the Power Supply Control Unit 62 every time when it judges a reverse input.

The Assist Control Unit 61 repeats such a process, and clears the accumulated Amount E Corresponding to Power Generation Energy to zero (S13), when an interruption of the power generation at the Electric Motor 20 is detected (S12: No) before the Amount E Corresponding to Power Generation Energy exceeds the Criterion Value E0. On the other hand, when a power generation state is continued at the Electric Motor 20 and the Amount E Corresponding to Power Generation Energy exceeds the Criterion Value E0 (S16: Yes), in Step S17, it is judged whether the current Steering Speed ωx is larger than the Criterion Value ω0 or not. When the Steering Speed ωx is less than or equal to the Criterion Value ω0, the Assist Control Unit 61 judges the state as "no reverse input" in Step S14, and exits from the reverse input judgment subroutine. On the other hand, when the current Steering Speed ωx exceeds the Criterion Value ω0, the Assist Control Unit 61 judges the state as "reverse input detected" and sets the Judgment Flag F at "1" in Step S18, and exits from the reverse input judgment subroutine.

Figure 9:
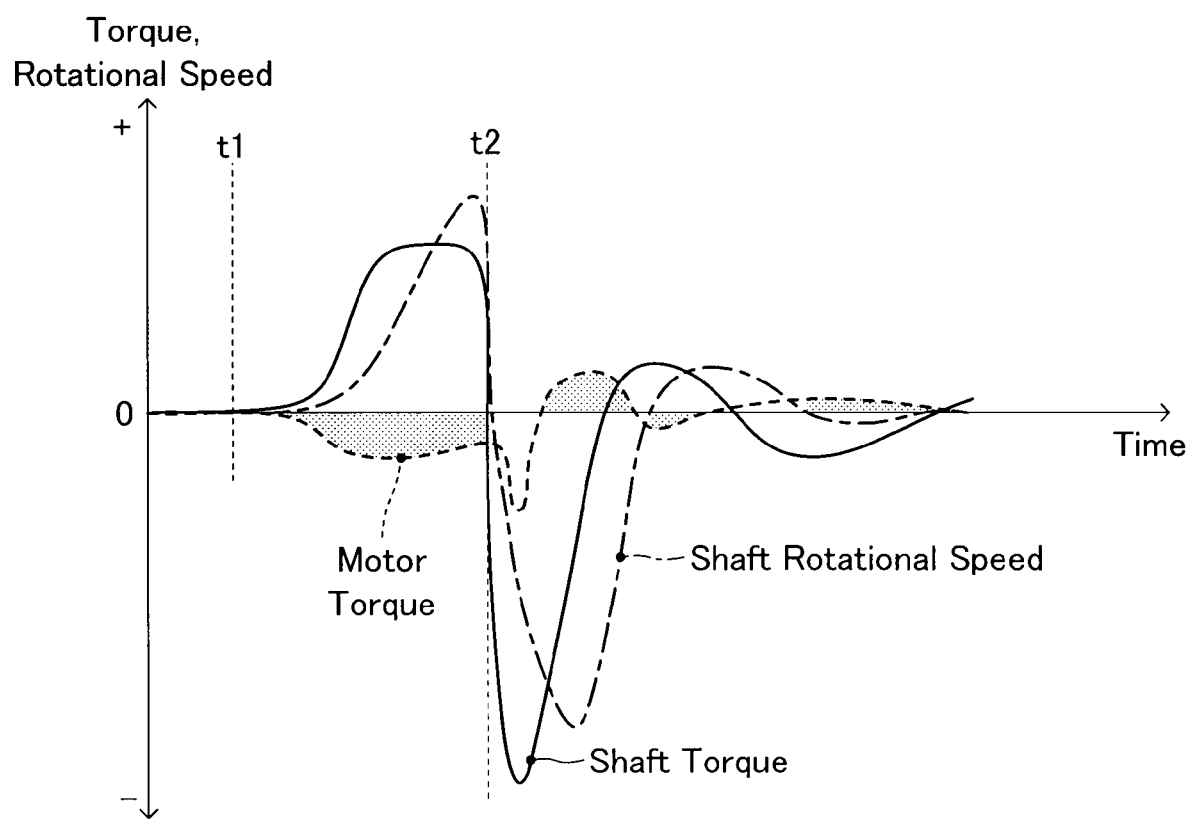
FIG. 9 is a graph showing a transition of shaft torque, motor torque, and shaft revolution in case of a reverse input.

FIG. 9 is a graph obtained by measuring temporal transitions of the rotational speed of the Steering Shaft 12 (corresponding to the Steering Speed ω, and hereinafter referred to as shaft rotational speed), motor torque (corresponding to the Motor Current im), and torque acting on the Steering Shaft 12 (hereinafter referred to as shaft torque), when a tire of the Wheels To Be Steered W strikes on a curb. When a tire of the Wheels To Be Steered W strikes on a curb at the time of t1, the Wheels To Be Steered W are steered and the Rack Bar 14 moves in its axial direction. Thereby, the motion energy in the axial direction of the Rack Bar 14 is transmitted to the Steering Shaft 12 via the Rack and Pinion Mechanism 13, and the Steering Shaft 12 rotates. In addition, the rotation of the Steering Shaft 12 makes the rotor of the Electric Motor 20 rotate in the same direction. Then, at the time of t2, the Rack Bar 14 reaches the stroke-end, and one of the Rack-end Member 18 placed at the both ends of the Rack Bar 14 strikes on the Stopper Member 15a of the Rack Housing 15. Hereinafter, this collision will be referred to as a stroke-end collision.

In the figure, the period during which the rotational direction for generating motor torque is different from the rotational direction of the Steering Shaft 12 is a power generation period during which the Electric Motor 20 generates power generation energy. In the figure, the period in which the waveshape of the motor torque is blotted corresponds to the power generation period. As shown in the figure, when a tire strikes on a curb, the Steering Shaft 12 starts rotating. At this time, the output side (Wheels To Be Steered W side) of the Steering Shaft 12 rotates precedently as compared with the input side (steering handle side) thereof. Accordingly, since the Steering Torque Sensor 22 detects the Steering Torque Tx in the opposite direction to the rotational direction of the Steering Shaft 12, the Electric Motor 20 is controlled to be driven to the opposite direction to the rotational direction of the Steering Shaft 12. However, since the shaft rotational speed is so fast that the steering control according to the electric angle of the Electric Motor 20 cannot follow and the rotation energy of the Steering Shaft 12 is large, the rotor of the Electric Motor 20 is turned by the Steering Shaft 12. Consequently, the Electric Motor 20 comes to be under power generation state.

When the Rack Bar 14 reaches the stroke-end, the movement of the Rack Bar 14 is limited. At this time, the Steering Shaft 12 stops with vibration (repeated inversion of the rotational direction to the left and right). Accordingly, the power generation period of the Electric Motor 20 stops once when the Rack Bar 14 reaches the stroke-end, and thereafter occurs intermittently. In this case, in the early power generation period when a reverse input acts, the amount of power generation energy is large.

In addition to the above case of collision to a curb, the Electric Motor 20 may generate electric power when a quick steering operation of a driver rotates the rotor of the Electric Motor 20. Such a case occurs, for example, at the very moment of steering back in stationary steering operation, or in an emergency operations such as collision avoidance. The power generation energy that the Electric Motor 20 generates in accordance with such driving operations is considerably small as compared with the power generation energy that the Electric Motor 20 generates on a curb collision. Accordingly, it is possible to distinguish power generation due to driving operation and power generation due to a large reverse input such as a curb collision, by setting the Criterion Value E0 at a value which is larger than the Amount E Corresponding to Power Generation Energy estimated to be generated by driving operation (amount corresponding to power generation energy during one power generation period) and is smaller than the Amount E Corresponding to Power Generation Energy estimated to be generated by a large reverse input such as a curb collision. Thereby, a small reverse input state having no risk of affecting the Steering Mechanism 10 can be excluded from the judgment of a large reverse input state having a risk of affecting the Steering Mechanism 10.

In addition, in the reverse input judgment subroutine, since a reverse input is judged based on the amount corresponding to power generation energy during a continuous power generation period, there is not a defect of false detection of a reverse input state, for example, by picking up an instant increase in steering speed.

Next, the steering assist control process in Step S30 will be described. FIG. 4 is a flow chart specifically representing the process in Step S30 as a steering assist control subroutine. Once the steering assist control subroutine starts up, the Assist Control Unit 61 reads in the Vehicle Velocity Vx detected by the Vehicle Velocity Sensor 23 and the Steering Torque Tx detected by the Steering Torque Sensor 22 in Step S31.

Figure 10:
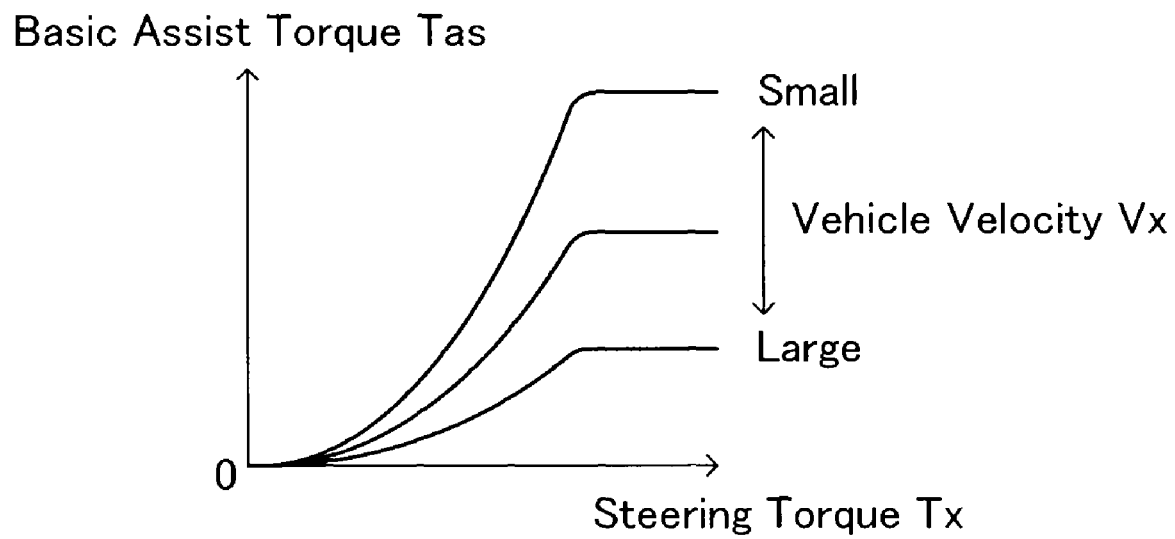
FIG. 10 shows performance curves representing a basic assist torque table.

Subsequently, in Step S32, referring to an assist torque table shown in FIG. 10, the Assist Control Unit 61 calculates a Basic Assist Torque Tas set in accordance with the input Vehicle Velocity Vx and Steering Torque Tx. The assist torque table is stored in the ROM of the Electronic Control Unit 60, wherein the Basic Assist Torque Tas is set so that it increases according to the increase of the Steering Torque Tx and the lower the Vehicle Velocity Vx becomes, the larger the value thereof becomes. Although, in FIG. 10, the assist torque table for steering to the right direction is shown, for steering to the left direction, only the direction of the Basic Assist Torque Tas is opposite and the magnitude is the same as that for steering to the right direction.

Subsequently, in Step S33, the Assist Control Unit 61 calculates a Target Instruction Torque T* by adding a compensating torque to the Basic Assist Torque Tas. The compensating torque is calculated as a sum of a return force to the basic position of the Steering Shaft 12, which increases proportionally to the Steering Angle θx, and loosening torque corresponding to a resisting force opposite to the rotation of the Steering Shaft 12, which increases proportionally to the Steering Speed ωx. As the Steering Angle θx, the value read in Step S11 is used, and the Steering Speed ωx is obtained by differentiating the Steering Angle θx with respect to time.

Next, in Step S34, the Assist Control Unit 61 calculates a Target Current ias* proportional to the Target Instruction Torque T*. The Target Current ias* is obtained by dividing the Target Instruction Torque T* by a torque constant.

Subsequently, in Step S35, the Assist Control Unit 61 calculates a Deviation Δi between the Motor Current im flows through the Electric Motor 20 and the Target Current ias*, and calculates a Target Instruction Voltage v* by means of a PI control (proportional-integral control) based on the Deviation Δi. As the Motor Current im, the value read in Step S11 is used.

Then, in Step S36, the Assist Control Unit 61 outputs a PWM control signal corresponding to the Target Instruction Voltage v* to the Motor Drive Circuit 30 and exits from the steering assist control routine. The steering assist control subroutine is repeatedly executed in a predetermined short cycle unless a reverse input is detected in the reverse input judgment process in Step S10. Accordingly, through the execution of the steering assist control routine, the duty ratio of the Switching Elements SW1 to SW6 in the Motor Drive Circuit 30 are controlled, and a desired assist torque according to the steering operation of a driver is obtained.

Such feedback control of the Electric Motor 20 is performed by means of vector control represented by a two-phase d-q axes coordination system with q axis in direction of the rotation of the Electric Motor 20 and d axis in direction rectangular to the rotational direction. Therefore, the Assist Control Unit 61 comprises a three-phase/two-phase coordination converter (not shown) for converting the three-phase Motor Current im (iu, iv, iw) detected by the Motor Current Sensor 38 into the d-q axes coordination system based on the electric angle of the motor, and converts the three-phase Motor Current im into d-axis Current id and q-axis Current iq by means of the three-phase/two-phase coordination converter. In addition, also for setting the Target Current ias*, target currents in the d-q axes coordination system (d-axis Target Current id*, q-axis Target Current iq*) are calculated. In this case, the q-axis current in the d-q axes coordination system is the current component for generating torque. Accordingly, in Step S34, the q-axis target current is set as the Target Current ias*, based on the Target instruction Torque t*. In addition, the Assist Control Unit 61 comprises a two-phase/three-phase coordination converter (not shown) in order to calculate a three-phase voltage instruction value (Instruction Voltage v*) corresponding to deviations (id*-id, iq*-iq), and calculates the three-phase Instruction Voltage v* by means of two-phase/three-phase coordination converter.

In the present specification, the target currents in the d-q axes coordination system (d-axis Target Current id*, q-axis Target Current iq*) are simply represented as ias*, and actual electric currents in the d-q axes coordination system (d-axis Current id, q-axis Current iq) are represented as the Motor Current im for purposes of explanation, since the present invention is not characterized by such a control using d-q axes coordination system. In addition, the Motor Current im used for the above-mentioned reverse input judgment routine corresponds to the actual q-axis Current iq in the d-q axes coordination system.

Next, the reverse input rotation suppression control process in Step S40 will be described. FIG. 5 is a flow chart specifically representing the process in Step S40 as a reverse input rotation suppression control subroutine. Once the reverse input rotation suppression control subroutine starts up, first, the Assist Control Unit 61 stops the steering assist control in Step S41. Namely, the Target Current ias* is set at zero (ias*=0).

Subsequently, in Step S42, the Assist Control Unit 61 outputs a PWM control signal to the Motor Drive Circuit 30 to short-circuit between the phases of the Electric Motor 20, i.e. short-circuit between the motor coils of at least two phases of the three phases. In the present embodiment, the Switching Elements SW1 and SW3 in the upper arms for U-phase and W-phase in the Motor Drive Circuit 30 are concurrently turned on (duty ratio=100%), and the remaining Switching Elements SW2, SW4, SW5 and SW6 are turned off (duty ratio=0%). Since the rotor of the Electric Motor 20 is rotated by a reverse input, a short-circuit current due to induced electromotive force flows through the motor coils, and thereby braking force acts to stop the rotation of the rotor. In addition, power generation energy is stored in the motor coils at this time.

Subsequently, in Step S43, the Assist Control Unit 61 waits until a predetermined time has passed. In case of short-circuit between the phases, the power generation energy is consumed as heat, and the motor coils and the Motor Drive Circuit 30 are overheated. Therefore, time restriction is set for overheat prevention. When the predetermined time has passed since the beginning of the short-circuit between the phases, in Step S44, the Assist Control Unit 61 outputs a PWM control signal to the Motor Drive Circuit 30 to release the power generation energy stored in the motor coils to the Subsidiary Power Supply 50 and make the Subsidiary Power Supply 50 absorb the energy. In the present embodiment, the Switching Element SW1 in the upper arms for U-phase and the Switching Element SW6 in the lower arms for W-phase in the Motor Drive Circuit 30 are concurrently turned on (duty ratio=100%), and the remaining Switching Elements SW2, SW3, SW4 and SW5 are turned off (duty ratio=0%). Thereby, the power generation energy stored in the motor coils is absorbed (regenerated) by the Subsidiary Power Supply 50, and the Subsidiary Power Supply 50 is charged. As will be described later, since the upper limit of the charging rate of the Subsidiary Power Supply 50 is set higher when a reverse input is detected, a large amount of power generation energy can be absorbed by the Subsidiary Power Supply 50. Accordingly, braking by means of short-circuit between phases can be sufficiently performed.

After the Assist Control Unit 61 controls the Motor Drive Circuit 30 to form a charging line to the Subsidiary Power Supply 50, the Assist Control Unit 61 maintains the state till the Ignition Switch 106 is turned off in Step S45, and finishes the reverse input rotation suppression control subroutine when the Ignition Switch 106 is turned off. Thereby, the main routine finishes.

Figure 11:
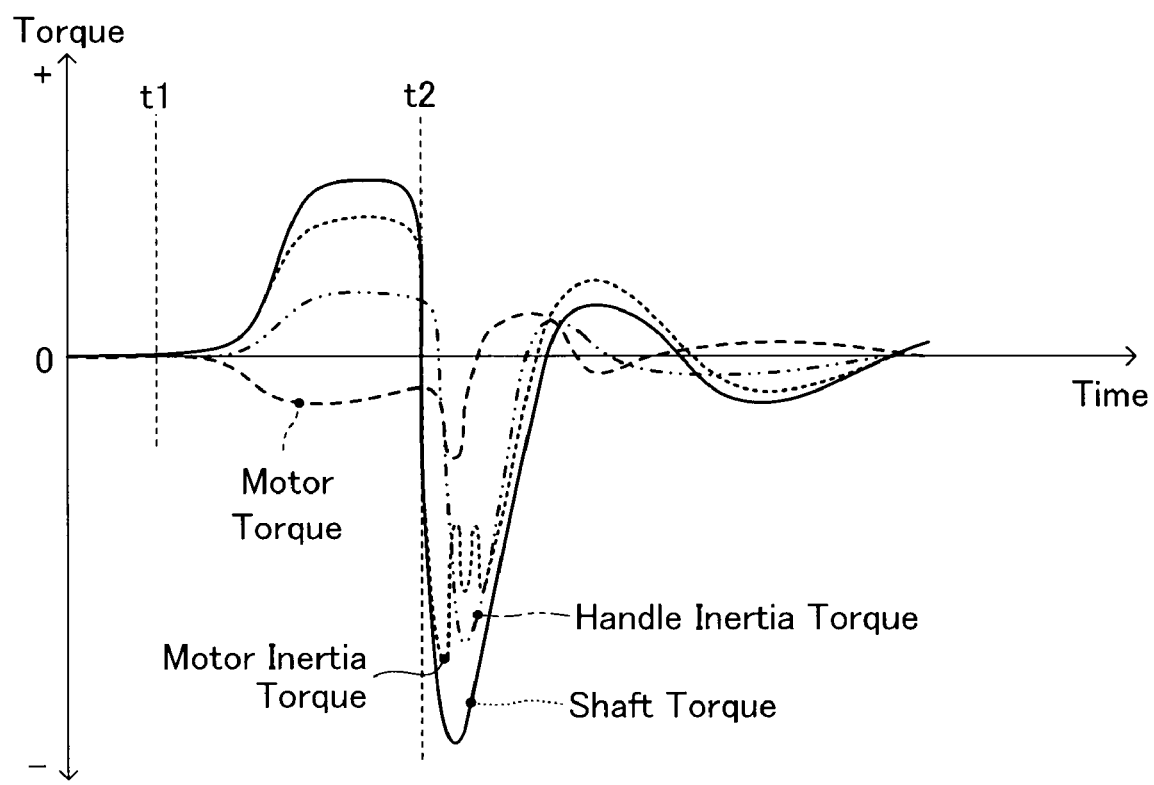
FIG. 11 is a graph showing a transition of a shaft torque component in case of a reverse input.

FIG. 11 is a graph representing temporal transitions of a shaft torque as well as its components in case that the reverse input rotation suppression control is not performed when a tire strikes on a curb. A shaft torque is represented as a sum of mainly motor torque generated at the Electric Motor 20, motor inertia torque, and handle inertia torque. When a tire of the Wheels To Be Steered W strikes on a curb at the time of t1, as described above, the Rack Bar 14 moves in its axial direction, and thereby, the Steering Shaft 12 and the Electric Motor 20 rotate. Then, at the time of t2, the Rack Bar 14 reaches the stroke-end, and the Rack-end Member 18 strikes on the Stopper Member 15*a* (stroke-end collision).

In this case, the output side of the Steering Shaft 12 rotates precedently, and the input side (Steering Handle 11 side) thereof rotates behind. When the stroke-end collision occurs, although the rotation of the output side of the Steering Shaft 12 is restrained by the stopped Rack Bar 14, the input side of the Steering Shaft 12 further rotates due to handle inertia torque and motor inertia torque since the input side of the Steering Shaft 12 is open. Accordingly, on the stroke-end collision, the direction in which the torsion bar of the Steering Shaft 12 is twisted is reversed. At this time, the Steering Torque Sensor 22 detects the Steering Torque Tx in the same direction as in case that the Steering Handle 11 is turned to the direction of the stroke-end collision, and therefore the torque output by the Electric Motor 20 acts to the direction of the stroke-end collision. Accordingly, torque (torsional torque) acting on the Steering Shaft 12 becomes very large. Therefore, the strength of the Steering Shaft 12 (strength of the Intermediate Shaft 12*b*, the Pinion Shaft 12*c*, and the Universal Joints 12*d* and 12*e* connecting them) needs to be high.

Therefore, in the present embodiment, when a reverse input is detected, the steering assist control is stopped to prevent the occurrence of motor torque acting to the direction of the stroke-end collision, and applies braking force to the Electric Motor 20 by means of the short-circuit between the phases in the Electric Motor 20 to reduce torque acting on the Steering Shaft 12. As a result, it becomes possible to decrease the strength of the Steering Shaft 12.

Figure 6:
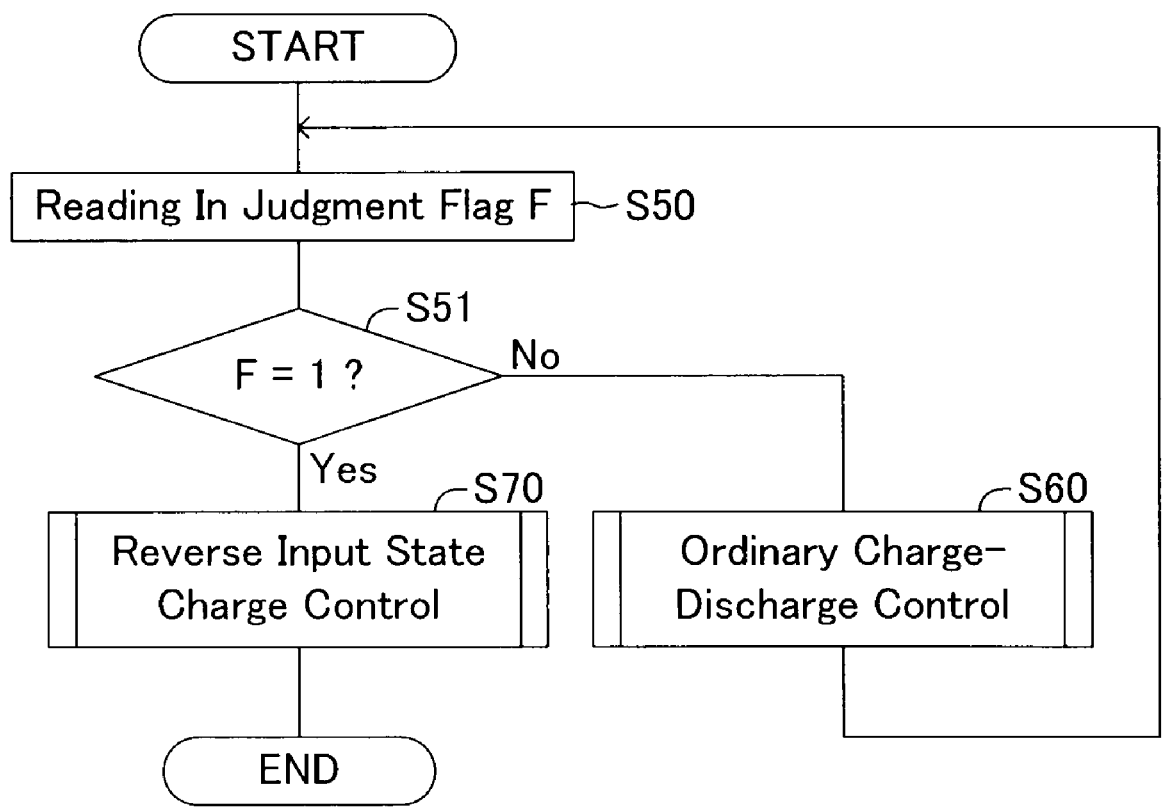
FIG. 6 is a flow chart showing a main routine executed by a power supply control unit.

Next, the process performed by the Power Supply Control Unit 62 of the Electronic Control Unit 60 will be described. FIG. 6 shows a main control routine performed by the Power Supply Control Unit 62, and the main control routine is stored as a control program in an ROM of the Electronic Control Unit 60. The main control routine is started up by turning on an Ignition Switch 106, and is executed in parallel with the above-mentioned main routine executed at the Assist Control Unit 61.

Once the main routine starts up, the Power Supply Control Unit 62 reads in the Judgment Flag F output by the Assist Control Unit 61 in Step S50. Subsequently, in Step S51, the Power Supply Control Unit 62 judges whether a reverse input is detected or not based on the Judgment Flag F, and when a reverse input is not detected (F=0), in Step S60, an ordinary charge-discharge control process is performed, and when a reverse input is detected (F=1), in Step S70, a reverse input state charge control process is performed.

Figure 7:
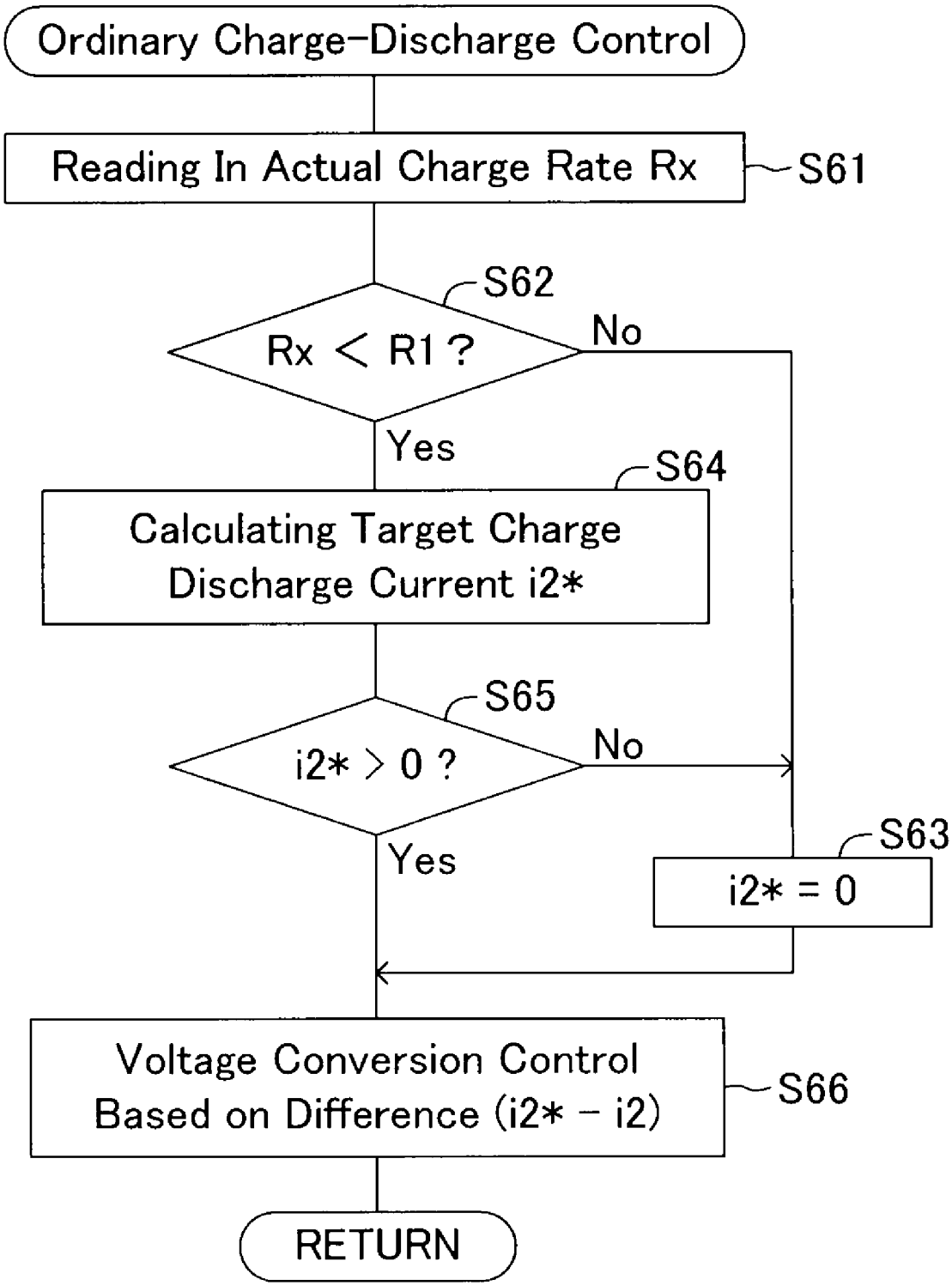
FIG. 7 is a flow chart showing an ordinary charge-discharge control subroutine.
Figure 8:
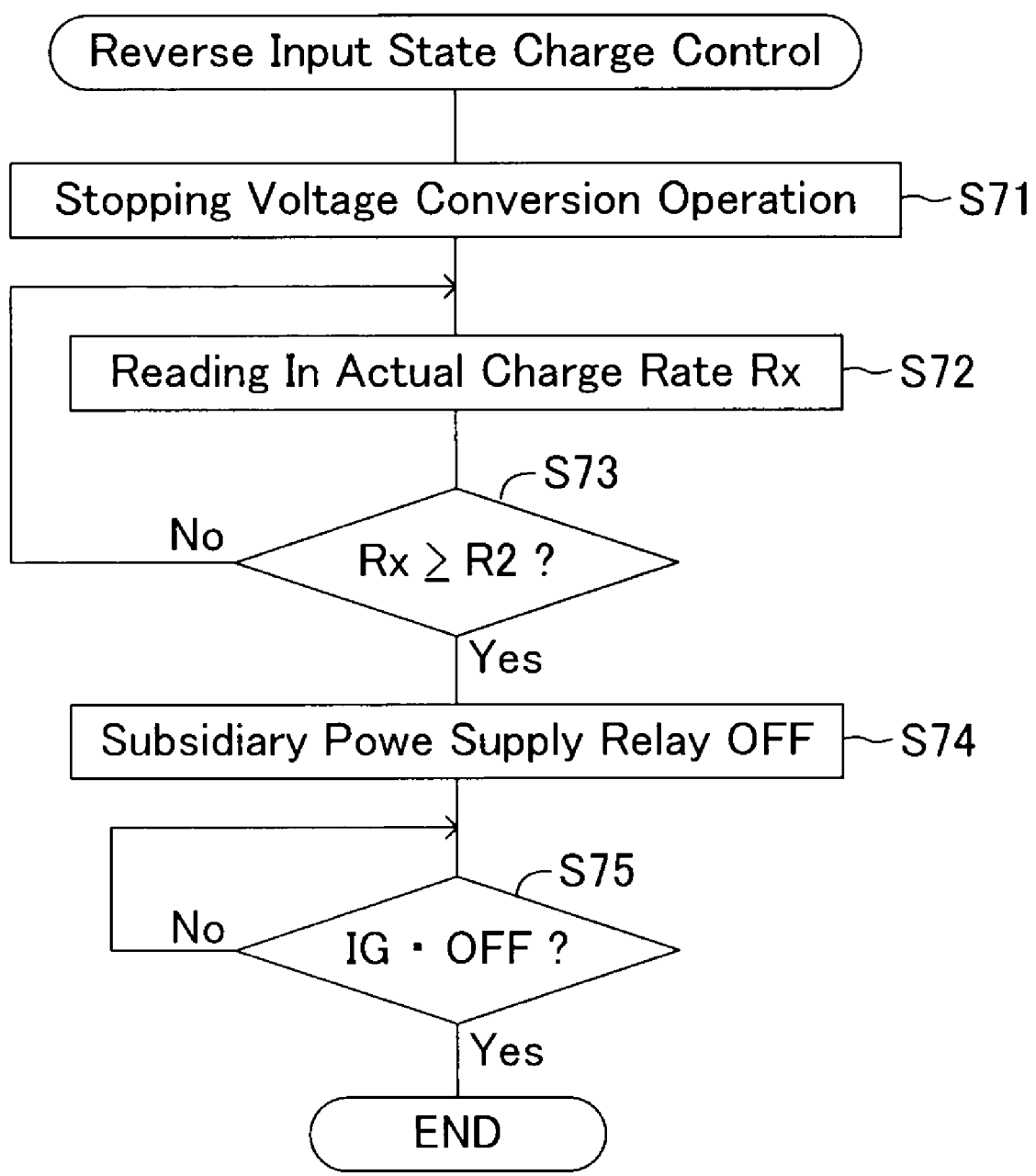
FIG. 8 is a flow chart showing a reverse input charge-discharge control subroutine.

The ordinary charge-discharge control process is processed in accordance with the subroutine shown in FIG. 7, and the reverse input state charge control process is processed in accordance with the subroutine shown in FIG. 8. During a period when a reverse input is not detected in Step S51, the Assist Control Unit 61 repeats the ordinary charge-discharge control process in Step S60 in a predetermined short cycle till the Ignition Switch 106 is turned off. On the other hand, when a reverse input is detected in Step S51, the reverse input state charge control process is performed and the main routine is finished.

First, the ordinary charge-discharge control process in Step S60 will be described. FIG. 7 is a flow chart specifically representing the process in Step S60 as an ordinary charge-discharge control subroutine. Once the ordinary charge-discharge control subroutine starts up, the Power Supply Control Unit 62 reads in an Actual Charge Rate Rx of the Subsidiary Power Supply 50 in Step S61. The Power Supply Control Unit 62 repeatedly executes a charge rate detection process in a predetermined cycle besides the ordinary charge-discharge control subroutine and, in Step S61, reads in, as the an Actual Charge Rate Rx, the current charge rate of the Subsidiary Power Supply 50 detected by the charge rate detection process.

The charge rate (SOC: State of Charge) represents the ratio of remaining capacity to full charging capacity. The Power Supply Control Unit 62 detects the Actual Charge Rate Rx of the Subsidiary Power Supply 50 based on the Actual Charge Discharge Current i2 detected by the Second Current Sensor 53 and the Subsidiary Power Supply Voltage v2 detected by the Second Voltage Sensor 54. For example, the charge rate may be calculated by measuring the internal resistance of the Subsidiary Power Supply 50. The internal resistance is calculated from a discharge current and a discharge voltage. Since there is a correlation between the internal resistance and the charge rate, the charge rate can be calculated by storing a calculation table of charge rate against internal resistance and referring to the calculation table.

In addition, the charge rate can be calculated by monitoring the Actual Charge Discharge Current i2 and adding the integrated value of the Actual Charge Discharge Current i2 (the value obtained by subtracting the integrated value of discharging current from the integrated value of charging current) to an initial charging capacity. In this case, the initial charging capacity may be stored in memory, and may be periodically calculated based on the amount of voltage drop against the discharging current flowing through the Subsidiary Power Supply 50.

In addition, in case that a capacitor (electric double layer capacitor) is used as the Subsidiary Power Supply 50, if the charge in the Subsidiary Power Supply 50 is discharged when the Ignition Switch 106 is turned off, and thereby the initial charging capacity at the timing of the Ignition Switch 106 being turned on is set at zero, the integrated value of the Actual Charge Discharge Current i2 can be estimated as the charging capacity of the Subsidiary Power Supply 50. In this case, the Actual Charge Rate Rx comes to (integrated value of Actual Charge Discharge Current i2/full charging capacity).

Now, returning to the description of the ordinary charge-discharge control subroutine. In Step S62, the Power Supply Control Unit 62 judges whether the Actual Charge Rate Rx is lower than a predetermined Upper Limit of Charging Rate R1 (for example, 60%) or not. When the Actual Charge Rate Rx reaches the Upper Limit of Charging Rate R1 (S62: Yes), a Target Charge Discharge Current i2* is set at zero (i2=0) in order not to charge further. On the other hand, when the Actual Charge Rate Rx does not reach the Upper Limit of Charging Rate R1 (S62: No), the Target Charge Discharge Current i2* is obtained by the following calculation. As apparent from the process that will be described later, the Upper Limit of Charging Rate R1 not only sets the upper limit of the Actual Charging Rate Rx, but also functions as a target charging rate.

$$i2^* = (W\max - Wx)/v2$$

Wmax is allowable output power of the Voltage Converter 40, and Wx is power consumption of the Motor Drive Circuit 30, and v2 is output voltage detected by the First Voltage Sensor 52. The Allowable Output Power Wmax is a value predetermined based on the specification of the Voltage Converter 40. The Power Consumption Wx of the Motor Drive Circuit 30 is calculated by multiplying a value obtained by subtracting the Actual Charge Discharge Current i2 detected by the Second Current Sensor 53 from the Output Current i1 detected by the First Current Sensor 51 (i1-i2) by the Output Voltage v1 detected by the First Voltage Sensor 52. Accordingly, the process in Step S64 includes a process for reading in the electric current values measured by the First Current Sensor 51 and the Second Current Sensor 53 and the voltage value measured by the First Voltage Sensor 52. The Power Consumption Wx of the Motor Drive Circuit 30 may be calculated based on the Motor Current im detected by the Motor Current Sensor 38 and the Output Voltage v1 detected by the First Voltage Sensor 52.

Subsequently, in Step S65, the Power Supply Control Unit 62 judges whether the Target Charge Discharge Current i2* is a positive value or not. As described above, the Target Charge Discharge Current i2* is obtained by subtracting the Power Consumption Wx of the Motor Drive Circuit 30 from the Allowable Output Power Wmax of the Voltage Converter 40 and dividing the result of the subtraction by the Output Voltage v2. Accordingly, when the Power Consumption Wx of the Electric Motor 20 is in the range of the Allowable Output Power Wmax of the Voltage Converter 40, it comes to i2*>0 (S65: Yes), and conversely when the Power Consumption Wx of the Electric Motor 20 is more than or equal to the Allowable Output Power Wmax of the Voltage Converter 40, it comes to i2*≦0 (S65: No).

When the Target Charge Discharge Current i2* is less than or equal to zero (i2*≦0), the Target Charge Discharge Current i2* is newly set at zero (i2*=0). On the other hand, when the Target Charge Discharge Current i2* is a positive value (i2*>0), the Target Charge Discharge Current i2* is not changed.

After setting the Target Charge Discharge Current i2* as described above, the Power Supply Control Unit 62 proceeds with the process to Step S66. In Step S66, the converted voltage of the Voltage Converter 40 is controlled by means of feedback based on the deviation between the Target Charge Discharge Current i2* and the Actual Charge Discharge Current i2. Namely, the converted voltage of the Voltage Converter 40 is controlled so that the deviation between the Target Charge Discharge Current i2* and the Actual Charge Discharge Current i2 (i2*-i2) is dissolved. In the present embodiment, PID control based on the deviation (i2*-i2) is performed.

The Power Supply Control Unit 62 outputs a pulse signal with a predetermined period to the gates of the First and Second Voltage Converting Switching Elements 43 and 44 to turn on and off both of the Switching Elements 43 and 44, and converts the electric power supplied from the Main Power Supply 100. In this case, the converted voltage is controlled by changing the duty ratio of the pulse signal.

According to the ordinary charge-discharge control subroutine, when the Target Charge Discharge Current i2* is a positive value (i2*>0), the voltage conversion is controlled so that an electric current flows in a direction for charging the Subsidiary Power Supply 50 and the magnitude of the electric current becomes the Target Charge Discharge Current i2*. Accordingly, the converted voltage of the Voltage Converter 40 is controlled to be higher than the power supply voltage of the Subsidiary Power Supply 50. Namely, when the Actual Charge Rate Rx does not reach the Upper Limit of Charging Rate R1 and the output of the Voltage Converter 40 has a margin to the power consumption of the Motor Drive Circuit 30 (electric power consumed for driving the Electric Motor 20), the electric power of the Main Power Supply 100 is charged at the Subsidiary Power Supply 50 via the Voltage Converter 40. In addition, since the Target Charge Discharge Current i2* is set so that power supply for the Motor Drive Circuit 30 is secured and further the Subsidiary Power Supply 50 is charged fully using the power supply capacity of the Voltage Converter 40, the Subsidiary Power Supply 50 can be quickly charged.

On the other hand, when the Target Charge Discharge Current i2* is set at zero (i2*=0), the converted voltage of the Voltage Converter 40 is controlled so that none of charging current and discharging current flows through the Subsidiary Power Supply 50. Accordingly, the converted voltage of the Voltage Converter 40 comes to be controlled to be the same voltage as the power supply voltage of the Subsidiary Power Supply 50. Therefore, the Subsidiary Power Supply 50 is not charged. In addition, unless the power consumption of the Motor Drive Circuit 30 exceeds the output capacity of the Voltage Converter 40, the converted voltage is maintained so that discharge current does not flow from the Subsidiary Power Supply 50, and the Motor Drive Circuit 30 operates only using the output power of the Voltage Converter 40. Then, when the state reaches a state that the power consumption of the Motor Drive Circuit 30 exceeds the output capacity limit of the Voltage Converter 40, in spite of the control of the voltage conversion, the discharge current of the Subsidiary Power Supply 50 cannot be maintained at zero, and the converted voltage decreases. Thereby, the shortfall of the electric power is supplied from the Subsidiary Power Supply 50 to the Motor Drive Circuit 30. Namely, when the power consumption of the Motor Drive Circuit 30 is within the range of the output capacity of the Voltage Converter 40, the electric power of the Subsidiary Power Support 50 is not used and only when a large electric power exceeding the output capacity is needed, electric power is supplied from the Subsidiary Power Supply 50 in addition to the Main Power Supply 100, to the Motor Drive Circuit 30.

Next, the reverse input state charge control process in Step S70 will be described. FIG. 8 is a flow chart specifically representing the process in Step S70 as an reverse input state charge control subroutine. The reverse input state charge control subroutine starts up when the Assist Control Unit 61 detects a reverse input. At this time, as described above, the Assist Control Unit 61 performs the short-circuit between the phases of the Electric Motor 20 for a predetermined period, and thereafter controls the Motor Drive Circuit 30 so that the Subsidiary Power Supply 50 absorbs the power generation energy stored at the Electric Motor 20.

Then, the Power supply Control Unit 62 executes the following process to properly absorb the power generation energy stored at the Electric Motor 20. First, in Step S71, the voltage conversion operation by the Voltage Converter 40 is stopped. Namely, the pulse signals output to the First Voltage Converting Switching Element 43 and the Second Voltage Converting Switching Element 44 of the Voltage Converter 40 are stopped. Subsequently, in Step S72, the Actual Charge Rate Rx is read in. Subsequently, in Step S73, it is judged whether the Actual Charge Rate Rx is more than or equal to an Upper Limit of Charging Rate R2 or not. The Upper Limit of Charging Rate R2 is set at a value larger than the Upper Limit of Charging Rate R1 used for the ordinary charge-discharge control process (for example, 95%). When the Actual Charge Rate Rx is less than the Upper Limit of Charging Rate R2 (S73: No), the process is returned to Step S72. Namely, till the Actual Charge Rate Rx reaches the Upper Limit of Charging Rate R2, the reading of the Actual Charge Rate Rx and the judgment by comparing with the Upper Limit of Charging Rate R2 are continued.

At this time, the Assist Control Unit 61 performs the short-circuit between the phases of the Electric Motor 20 for a predetermined period, and thereafter sends the power generation energy stored at the Electric Motor 20 to the Subsidiary Power Supply 50 side via the Motor Drive Circuit 30. Therefore, the power generation energy is regenerated to the Subsidiary Power Supply 50, and the Actual Charge Rate Rx increases. In this case, since the Upper Limit of Charging Rate R2 is set at a value larger than the Upper Limit of Charging Rate R1 used for the ordinary charge-discharge control process, the amount of regeneration can be increased, and sufficient braking force can be generated by the short-circuit between the phases of the Electric Motor 20. In addition, since regeneration to the Main Battery 101 via the Voltage converter 40 is not needed, regeneration can be performed without any load on the Voltage Converter 40.

The Power supply Control Unit 62 waits in Step S73 till the Actual Charge Rate Rx reaches the Upper Limit of Charging Rate R2, and, when the Actual Charge Rate Rx reaches the Upper Limit of Charging Rate R2 by means of the regeneration of the power generation energy to the Electric Motor 20, outputs an OFF signal to the Subsidiary Power Supply Relay 115 in Step S74. Thereby, the Subsidiary Power Supply Relay 115 opens its contact point inside thereof to shut off the charging line. Accordingly, the charging of the Subsidiary Power Supply 50 is stopped. The Subsidiary Power Supply Relay 115 is controlled to close its contact point by an ON signal when the main routine of the Power supply Control Unit 62 starts up.

After the Subsidiary Power Supply Relay 115 shuts off the charging line to the Subsidiary Power Supply 50, the Power supply Control Unit 62 maintains the state in Step S75 till the Ignition Switch 106 is turned off. At this time, when all of the power generation energy stored at the Electric Motor 20 is not absorbed by the Subsidiary Power Supply 50, the remaining energy is consumed for charging the Main Battery 101 of the Main Power Supply 100 and as heat generation at each circuit.

When he Ignition Switch 106 is turned off, the Power supply Control Unit 62 finishes the reverse input state charge control subroutine. Thereby, the main routine finishes.

The above-described electric power steering device according to the present embodiment can exclude a small reverse input state not affecting the Steering Mechanism 10 and precisely detect a large reverse input state having a risk of affecting the Steering Mechanism 10, since it is judged whether a reverse input exists or not based on the amount corresponding to power generation energy generated at the Electric Motor 20.

In addition, since dynamic braking is applied by means of the shot-circuit between the phases of the Electric Motor 20 to make short-circuit current flows through the motor coils when a reverse input is detected, the rotation of the Steering Shaft 12 is suppressed and the torque acts on the Steering Shaft 12 in the event of stroke-end collision is reduced. Accordingly, the Steering Shaft 12 can be protected from impact, and the strength of the Steering Shaft 12 can be lowered, and weight and cost can be saved.

In addition, since the power generation energy stored at the Electric Motor 20 is regenerated to the Subsidiary Power Supply 50 aiding the power supply by the Main Power Supply 100, the Subsidiary Power Supply 50 can be efficiently used to prevent the overheat of the Electric Motor 20 and the Motor Drive Circuit 30. In addition, since the upper limit of charging rate is increased when the power generation energy is regenerated to the Subsidiary Power Supply 50, the amount of regeneration can be increased and sufficient braking force can be generated by means of the short-circuit between the phases of the Electric Motor 20.

In addition, since the Voltage Converter 40 which converts the output voltage of the Main Power Supply 100 to supply electric power to the Motor Drive Circuit 30 is included, the Electric Motor 20 can be driven with large electric power. In addition, since the Motor Drive Circuit 30 and the Subsidiary Power Supply 50 are connected in parallel to the Voltage Converter 40 to aid the power supply to the Motor Drive Circuit 30 with the electric power stored in the Subsidiary Power Supply 50 when the Motor Drive Circuit 30 needs large electric power, the output of the electric power steering device can be increased without increasing the capacity of the Main Power Supply 100. In addition since the charging and discharging of the Subsidiary Power Supply 50 are controlled by controlling the converted voltage of the Voltage Converter 40, it becomes easy to maintain the Actual Charge Rate Rx of the Subsidiary Power Supply 50 at the upper limit of charging rate.

Although the electric power steering device according to the present embodiment has been described herein before, the present invention is not limited the above-described embodiment, and various modifications are possible, so long as the invention is not modified in essence.

Figure 12:
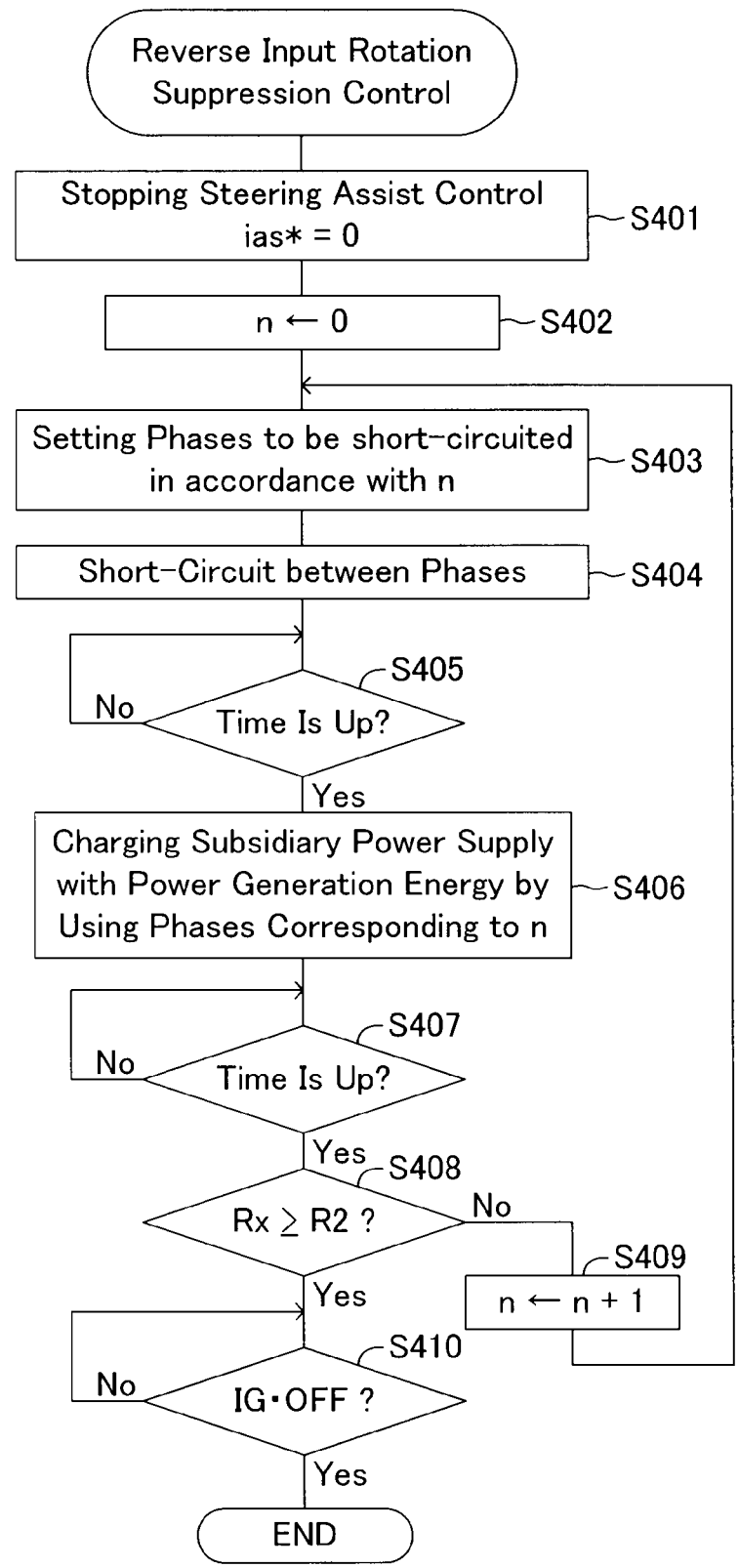
FIG. 12 is a flow chart showing a reverse input rotation suppression control subroutine as a modification.

Now, one modification of the reverse input rotation suppression control process will be described. FIG. 12 exemplifies a modification the reverse input rotation suppression control subroutine in FIG. 5. Once the reverse input rotation suppression control subroutine according to the present modification starts up, first, the Assist Control Unit 61 stops steering assist control in Step S401. Subsequently, the Variable n is set at "0" in Step S402. Subsequently, the phases to be short-circuited are set in accordance with the Variable n. For example, the phases to be short-circuited are U-W phases when the Variable n is "0", the phases to be short-circuited are V-W phases when the Variable n is "1", and the phases to be short-circuited are V-U phases when the Variable n is "2". In addition, when the Variable n is more than or equal to "3", the phases to be short-circuited corresponding to the value obtained by subtracting "3" or a multiple number of "3" from the Variable.

Subsequently, in Step S404, the Assist Control Unit 61 outputs a PWM control signal to the Motor Drive Circuit 30 to short-circuit between the motor coils of the Electric Motor 20 by using the phases set to be short-circuited. Thereby, a short-circuit current flows through the motor coils, and thereby braking force acts on the Electric Motor 20. Subsequently, in Step S405, the Assist Control Unit 61 waits until a predetermined time has passed.

When the predetermined time has passed, in Step S406, the Assist Control Unit 61 outputs a PWM control signal to the Motor Drive Circuit 30 to release the power generation energy stored in the motor coils to the Subsidiary Power Supply 50 and make the Subsidiary Power Supply 50 absorb the energy by using the phases set to be short-circuited in accordance with the Variable n. For example, when the Variable n is "0", the Switching Element SW1 in the upper arms for U-phase and the Switching Element SW6 in the lower arms for W-phase are concurrently turned on, and the remaining Switching Elements SW2, SW3, SW4 and SW5 are turned off. When the Variable n is "1", the Switching Element SW3 in the upper arms for W-phase and the Switching Element SW5 in the lower arms for V-phase are concurrently turned on, and the remaining Switching Elements SW1, SW2, SW4 and SW6 are turned off. When the Variable n is "2", the Switching Element SW2 in the upper arms for V-phase and the Switching Element SW4 in the lower arms for U-phase are concurrently turned on, and the remaining Switching Elements SW1, SW3, SW5 and SW6 are turned off. Thereby, the power generation energy stored in the motor coils is absorbed (regenerated) by the Subsidiary Power Supply 50, and the Subsidiary Power Supply 50 is charged. Subsequently, in Step S407, the Assist Control Unit 61 waits until a predetermined time has passed.

When the predetermined time has passed, in Step S408, the Assist Control Unit 61 judges whether the Actual Charge Rate Rx is more than or equal to the Upper Limit of Charging Rate R2 or not, and when the Actual Charge Rate Rx is not more than or equal to the Upper Limit of Charging Rate R2, in Step S409, the value of the Variable n is incremented by "1", and the process is returned to Step S403. Accordingly, the phases to be short-circuited are changed and the above-mentioned process is repeated.

After repeating such a process, when the Actual Charge Rate Rx reaches the Upper Limit of Charging Rate R2, in Step S410, the Assist Control Unit 61 maintains the state till the Ignition Switch 106 is turned off, and when the Ignition Switch 106 is turned off, the reverse input state rotation suppression control subroutine is finished.

Since the above-described reverse input state rotation suppression control subroutine according to the present modification repeats the short-circuit process between the phases of the motor coils and the release of the power generation energy to the Subsidiary Power Supply 50 with the phases being switched over, an effect that any particular phase of the Electric Motor 20 and the Motor Drive Circuit 40 is not loaded and the circuit can be protected can be achieved.

In addition, although the present embodiment has a configuration comprising the Voltage Converter 40 and the Subsidiary Power Supply 50, they are not always essential, another modification may have a configuration with both or one of them omitted.

In addition, although the present embodiment has a configuration wherein a brushless three-phase motor is driven by an inverter circuit, it may be a configuration wherein a single-phase motor is driven by an H-bridged circuit. In this case, the power terminals of an electric motor may be short-circuited in order to apply a brake on an electric motor when a reverse input is detected.

In addition, although the Rotation Angle Sensor 21 for detecting the rotation angle of the Electric Motor 20 detects the Steering Angle θx and the Steering Speed ωx in the present embodiment, for example, it may be a configuration wherein a rotation angle sensor is disposed on the Steering Shaft 12, and the Steering Angle θx and the Steering Speed ωx is calculated from the rotation angle and the rotation angular velocity of the Steering Shaft 12.

The invention claimed is:

1. An electric power steering device for assisting a driver's steering operation by driving an electric motor disposed in a steering mechanism that generates a steering assist torque for steering a wheel in a first direction that coincides with the driver's steering operation, the electric power steering device comprising:
   a motor output detector to detect an output of said electric motor,
   a rotational state detector to detect a rotational state of said steering mechanism,
   a power generation state detector to detect a power generation state of said electric motor where a direction for generating torque of said electric motor does not match a rotational direction of said steering mechanism, based on detection results of said motor output detector and said rotational state detector,
   a power generation energy calculator to calculate an amount corresponding to power generation energy generated at said electric motor during a period when said power generation state is detected continuously,
   a reverse input detector to judge an input state as a reverse input state, where a reverse input is acting on said steering mechanism via the wheel, in which the reverse input acts on the wheel in a second direction that does not coincide with the driver's steering operation, when said calculated amount corresponding to power generation energy exceeds a criterion value, and
   a reverse input rotation suppressor to suppress rotation of said steering mechanism by said reverse input by suppressing rotation of said steering mechanism in the second direction, when said reverse input detector detects the reverse input state, such that the wheel is suppressed from rotating in the second direction that does not coincide with the driver's steering operation.

2. The electric power steering device according to claim 1, wherein:
   said rotational state detector detects a rotational speed of said electric motor or a rotational speed of a steering shaft.

3. The electric power steering device according to claim 2, wherein:
   said motor output detector is a motor current detector to detect an electric current flowing through said electric motor,
   said power generation state detector detects a power generation state of said electric motor where the direction for generating torque of said electric motor with the electric current detected by said motor current detector does not match the rotational direction of said steering mechanism detected by said rotational state detector, and
   said power generation energy calculator calculates, as said amount corresponding to power generation energy, a time integration value of a product of the electric current detected by said motor current detector and the rotational speed detected by said rotational state detector during a period when said power generation state is detected continuously.

4. The electric power steering device according to one of claim 1 to claim 3, wherein:
   said reverse input rotation suppressor controls a drive circuit of said electric motor and short-circuits between phases of said electric motor to apply a brake to said electric motor.

5. The electric power steering device according to one of claim 1 to claim 3, further comprising:
   a voltage converter to convert the output voltage of an onboard battery to supply electric power to a drive circuit of said electric motor, a subsidiary power supply, which is connected in parallel with the drive circuit of said electric motor to said voltage converter to be charged by said voltage converter and to aid the electric power supply for the drive circuit of said electric motor by discharging its stored electric energy, and
   a regeneration controller to control the drive circuit of said electric motor to make said subsidiary power supply absorb the power generation energy generated at said electric motor.

6. The electric power steering device according to claim 5, further comprising:
   a charge restrictor to restrict the charging rate of said subsidiary power supply at a upper limit of charging rate or below, and
   an upper limit charging rate adjuster to increase said upper limit of charging rate when the reverse input detector judges the input state as the reverse input state.

7. The electric power steering device according to claim 1, further comprising:
   a steering assist controller to control said electric motor relative to the driver's steering operation, wherein said control by said steering assist controller is stopped in response to said reverse input detector judging the input state as the reverse input state.

8. An electric power steering device for assisting a driver's steering operation by driving an electric motor disposed in a steering mechanism that generates a steering assist torque for steering a wheel in a first direction that coincides with the driver's steering operation, the electric power steering device comprising:
   motor output detection means for detecting an output of said electric motor;
   rotational state detection means for detecting a rotational state of said steering mechanism;
   power generation state detection means for detecting a power generation state of said electric motor where a direction for generating torque of said electric motor does not match a rotational direction of said steering mechanism, based on detection results of said motor output detection means and said rotational state detection means;

a power generation energy calculation means for calculating an amount corresponding to power generation energy generated at said electric motor during a period when said power generation state is detected continuously;

a reverse input detection means for judging an input state as a reverse input state, where a reverse input is acting on said steering mechanism via the wheel, in which the reverse input acts on the wheel in a second direction that does not coincide with the driver's steering operation, when said calculated amount corresponding to power generation energy exceeds a criterion value; and a reverse input rotation suppression means for suppressing the rotation of said steering mechanism by said reverse input by suppressing rotation of said steering mechanism in the second direction, when said reverse input detection means detects the reverse input state, such that the wheel is suppressed from rotating in the second direction that does not coincide with the driver's steering operation.

9. A method of an electric power steering device for assisting a driver's steering operation by driving an electric motor disposed in a steering mechanism that generates a steering assist torque for steering a wheel in a first direction that coincides with the driver's steering operation, the method comprising:

detecting, by a motor output detector, an output of said electric motor;

detecting, by a rotational state detector, a rotational state of said steering mechanism;

detecting a power generation state of said electric motor where a direction for generating torque of said electric motor does not match a rotational direction of said steering mechanism, based on detection results of said detecting by said motor output detector and said rotational state detector;

calculating an amount corresponding to power generation energy generated at said electric motor during a period when said power generation state is detected continuously;

judging an input state as a reverse input state, where a reverse input is acting on said steering mechanism via the wheel, in which the reverse input acts on the wheel in a second direction that does not coincide with the driver's steering operation, when said calculated amount corresponding to power generation energy exceeds a criterion value; and suppressing the rotation of said steering mechanism by said reverse input by suppressing rotation of said steering mechanism in the second direction, when said input state is judged as the reverse input state, such that the wheel is suppressed from rotating in the second direction that does not coincide with the driver's steering operation.

10. The electric power steering device according to claim 7, wherein:

said control by said steering assist controller is stopped in response to said reverse input detector judging the input state as the reverse input state until the electric power steering device is restarted.

11. The electric power steering device according to claim 7, wherein:

said control by said steering assist controller is stopped in response to said reverse input detector judging the input state as the reverse input state until the reverse input rotation suppressor stops suppressing the rotation of said steering mechanism by said reverse input.

12. The electric power steering device according to claim 7, wherein:

said steering assist controller controls said electric motor relative to the driver's steering operation so as to assist a mechanical linkage between a steering wheel operated by the driver and wheels of a vehicle.

13. The electric power steering device according to claim 1, wherein the electric motor disposed in the steering mechanism is mechanically coupled to steering linkage of a wheel to be steered by a stroke motion of a rack bar.

14. The electric power steering device according to claim 1, wherein the wheel is a left or right front wheel of a vehicle, and the driver's steering operation is performed by rotating a steering handle of the vehicle.

* * * * *